(12) United States Patent
Katragadda

(10) Patent No.: US 7,685,144 B1
(45) Date of Patent: Mar. 23, 2010

(54) DYNAMICALLY AUTOCOMPLETING A DATA ENTRY

(75) Inventor: Lalitesh Katragadda, San Jose, CA (US)

(73) Assignee: Google Inc., Mountain View, CA (US)

( * ) Notice: Subject to any disclaimer, the term of this patent is extended or adjusted under 35 U.S.C. 154(b) by 296 days.

(21) Appl. No.: 11/323,134

(22) Filed: Dec. 29, 2005

(51) Int. Cl.
*G06F 17/30* (2006.01)

(52) U.S. Cl. ............................. 707/101; 707/1; 707/3; 707/10; 707/100; 707/102

(58) Field of Classification Search .............. 707/1–5, 707/10, 100, 102, 104
See application file for complete search history.

(56) References Cited

U.S. PATENT DOCUMENTS

| | | | | |
|---|---|---|---|---|
| 5,845,300 | A * | 12/1998 | Comer et al. | 715/508 |
| 6,236,978 | B1 * | 5/2001 | Tuzhilin | 705/26 |
| 6,269,369 | B1 | 7/2001 | Robertson | |
| 6,349,299 | B1 | 2/2002 | Spencer et al. | |
| 6,393,421 | B1 | 5/2002 | Paglin | |
| 6,564,213 | B1 * | 5/2003 | Ortega et al. | 707/5 |
| 6,684,250 | B2 | 1/2004 | Anderson et al. | |
| 6,694,353 | B2 | 2/2004 | Sommerer | |
| 6,707,471 | B2 | 3/2004 | Funaki | |
| 6,820,075 | B2 * | 11/2004 | Shanahan et al. | 707/3 |
| 6,879,691 | B1 * | 4/2005 | Koretz | 380/255 |
| 6,957,229 | B1 | 10/2005 | Dyor | |
| 6,985,913 | B2 | 1/2006 | Murata | |
| RE39,326 | E * | 10/2006 | Comer et al. | 707/508 |
| 7,188,316 | B2 * | 3/2007 | Gusmorino et al. | 715/764 |
| 7,240,049 | B2 | 7/2007 | Kapur | |
| 7,249,158 | B2 | 7/2007 | Naitou | |
| 7,257,822 | B1 * | 8/2007 | Sambhus et al. | 719/328 |
| 7,265,858 | B2 | 9/2007 | Park et al. | |
| 7,337,448 | B1 * | 2/2008 | Dalia et al. | 719/328 |
| 7,376,640 | B1 | 5/2008 | Anderson et al. | |
| 2003/0023586 | A1 | 1/2003 | Knorr | |
| 2003/0036848 | A1 | 2/2003 | Sheha et al. | |
| 2003/0097361 | A1 | 5/2003 | Huang et al. | |
| 2004/0093317 | A1 | 5/2004 | Swan | |
| 2004/0186848 | A1 * | 9/2004 | Kobashikawa et al. | 707/102 |
| 2004/0186896 | A1 | 9/2004 | Daniell et al. | |
| 2004/0203642 | A1 | 10/2004 | Zatloukal et al. | |
| 2004/0254928 | A1 * | 12/2004 | Vronay et al. | 707/5 |
| 2005/0050547 | A1 * | 3/2005 | Whittle et al. | 719/310 |
| 2005/0108213 | A1 | 5/2005 | Riise et al. | |
| 2005/0114021 | A1 | 5/2005 | Krull et al. | |

(Continued)

OTHER PUBLICATIONS

U.S. Appl. No. 10/425,295, filed Apr. 29, 2003, Buchheit et al.

*Primary Examiner*—Cam-Linh Nguyen
(74) *Attorney, Agent, or Firm*—Fenwick & West LLP

(57) ABSTRACT

Techniques are disclosed for automatically generating and maintaining personal data, such as an address book, a financial portfolio, a discussion groups or blogs book, or other types of personal data stores, based on a person's structured search data and/or usage data (e.g., browsing) and/or other sources of personal data (e.g., emails the user receives). Related metadata can also be used in the generating and/or maintaining of the personal data. Dynamic personal data ranking and/or autocomplete functions are also provided, which can be used in conjunction with the automatic generation and maintenance of the user's personal data, to further ease the user's burden in managing and/or handling such data.

19 Claims, 8 Drawing Sheets

U.S. PATENT DOCUMENTS

| | | |
|---|---|---|
| 2006/0031365 A1 | 2/2006 | Kay et al. |
| 2006/0085750 A1 | 4/2006 | Easton et al. |
| 2006/0106778 A1 | 5/2006 | Baldwin |
| 2006/0190470 A1 | 8/2006 | Lemnotis |
| 2006/0224553 A1* | 10/2006 | Chtcherbatchenko et al. .. 707/1 |
| 2006/0288075 A1 | 12/2006 | Wu |
| 2007/0016556 A1 | 1/2007 | Ann et al. |
| 2007/0078860 A1 | 4/2007 | Enenkiel |

* cited by examiner

US 7,685,144 B1

DYNAMICALLY AUTOCOMPLETING A DATA ENTRY

FIELD OF THE INVENTION

The invention relates to personal data systems, and more particularly, to techniques for automatically generating and maintaining personal data (e.g., structured data such as addresses, phone numbers, and specific search topics), based on Internet search data and/or browser usage data, and/or related metadata.

BACKGROUND OF THE INVENTION

Generating and maintaining personal data is typically a manual process carried out by the person associated with that personal data. Consider, for example, a person's address book.

An address book is typically a collection of contact details, such as address (home and/or office), telephone number (home and/or office), mobile phone number, fax number, e-mail address, etc). Most address book systems store the contact entries in alphabetical order, by each contact's last name. Historically, paper-based address books have been used. Some such address books use loose-leaf binders so as to allow for updates to the address book (e.g., adding, removing, reordering), as the owner's contacts change over time.

Many people maintain their address books using electronic organizers or software-based address books, which eliminate many of the problems associated with traditional paper-based address books. For example, such address books have been used in e-mail systems for many years. In addition, personal information manager (PIM) systems are now available that integrate various now common functionalities such as an address book, personal calendar or schedule, and a timeline of action items or tasks to be completed.

Typically, entries of an electronic address book can be exchanged between host devices (e.g., between desktop computer and personal digital assistant), as well as synchronized so that the content of a person's address book at one location (e.g., desktop computer) is the same as the content of that user's address book at another location (e.g., PDA), thereby making the electronic address book very portable. Also, individual entries of an electronic address book can be transferred (e.g., vCards), thereby simplifying the exchange of contact information.

In any case, a person's electronic address book is a dynamically changing collection of data. Maintaining this address book is a significant chore, as the owner acquires new contacts or the details of existing contacts change. Currently, this maintenance is done manually by the owner, on an as needed basis. In addition to this time-consuming and tedious maintenance, the process of accessing a particular address (e.g., searching for a particular address among the many included in the address book, and then clicking), is again cumbersome and a barrier to regular and widespread address book use.

Other forms of dynamically changing personal data are also associated with such problems. For instance, consider a person's stock portfolio. Such a portfolio requires entries/updates, for example, when trades are made (e.g., purchase of new stock or additional shares, stock sale, etc), or when information about target companies becomes available.

What is needed, therefore, are techniques for automatically generating and maintaining address books. In a more general sense, there is a need for automatically generating and maintaining personal data, and making it useful to the user with minimal or no effort on part of the user.

SUMMARY OF THE INVENTION

One embodiment of the present invention is a computer-implemented method for dynamically autocompleting a data entry for a user. The method includes detecting when an input of data is required by a computer-based application, and identifying one or more data candidates by which the input could be satisfied, based on a dynamic ranking scheme associated with the user. The method continues with autocompleting the input of data with one of the one or more data candidates. The method may include the preliminary step of monitoring the user's computer use. In one particular case, autocompleting the input of data with one of the one or more data candidates includes displaying the one or more data candidates to the user, thereby allowing the user to select one of the one or more data candidates, and autofilling the selected data candidate into a user interface associated with the computer-based application for the user. In one such case, displaying the one or more data candidates is in response to partial data manually entered by the user into the user interface. In another such case, displaying the one or more data candidates is carried out prior to manual data entry into the user interface by the user. Rank assigned to each of the one or more data candidates in accordance with the dynamic ranking scheme can be based, for example, on geographic location of the user, and/or on time of use, and/or user browsing activity, and/or context of use. The method may include retrieving the one or more data candidates from a personal data storage associated with the user. In one such case, retrieving the one or more data candidates from a personal data storage associated with the user includes determining if the one or more data candidates is locally available. In response to the one or more data candidates being locally available, the method may continue with accessing those data candidates locally. In response to the one or more data candidates not being locally available, the method may continue with accessing those data candidates from a remote storage via a communications network. The method may includes estimating the user's geographic location based on metadata associated with at least one of the computer-based application, and previous searches performed by the user. Estimating the user's geographic location can be based on, for example, an IP address associated with the computer-based applications and/or address information entered by the user into a mapping system interface. In one particular case, the computer-based application is an email application and the input of data is an email address. In another particular case, the computer-based application is a browser application operatively coupled to a search engine, and the input of data is one or more search terms. Other such applications will be apparent in light of this disclosure. The method may include determining if a data candidate is correct, and discarding incorrect data candidates so that they are not displayed to the user.

Another embodiment of the present invention provides a machine-readable medium (e.g., one or more compact disks, diskettes, servers, memory sticks, or hard drives) encoded with instructions, that when executed by one or more processors, cause the processor to carry out a process for dynamically autocompleting a data entry for a user. This process can be, for example, similar to or a variation of the previously described method.

Another embodiment of the present invention is a system for dynamically autocompleting a data entry for a user. The system functionality can be implemented, for example, in software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. Many suitable means for implementing embodiments of the present invention will be apparent in light of this disclosure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1:
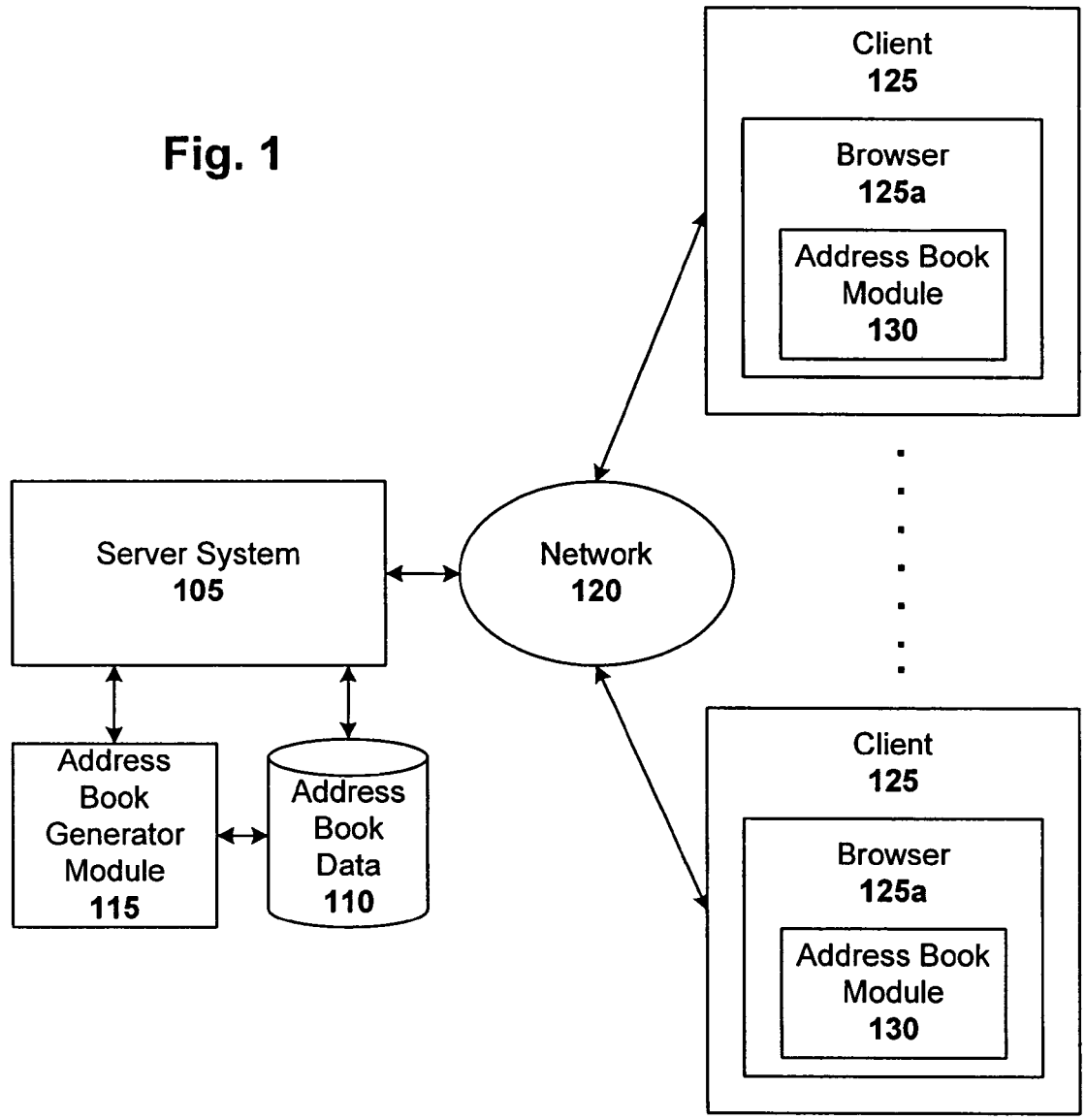
FIG. 1 is a block diagram of a system for generating and maintaining personal data, configured in accordance with one embodiment of the present invention.

Techniques are disclosed for automatically generating and maintaining personal data, such as an address book, a financial portfolio, a discussion groups or blogs book, or other types of personal data stores, based on a person's structured search data and/or usage data, and/or other types of structured data provided by the user or to the user. Related metadata and/or context can also be used in the generating and/or maintaining of the personal data.

Structured data comprises any data that can be extracted into a semi-structured or completely structured form. For example, a user provides structured data, either directly or indirectly, when conducting a search (e.g., such as an Internet search or a database query). For instance, in requesting driving directions from an online map service, a user directly provides structured data in the form of a start address and a destination address. Here, the start address can be inferred to be the user's home/work address or current locality using the techniques described herein, and the destination address can be inferred to be an address of interest to the user (e.g., friend or business contact). The user can indirectly provide structured data in the form of address information, for example, by conducting searches such as "grocery market near Palo Alto," where the user's home address or current locality can be inferred to be in Palo Alto. Likewise, in requesting stock information from a financial service, a user directly provides structured data in the form of a stock name or a company name. The user can also indirectly provide structured data in the form of financial information, for example, by conducting searches such as "chip makers," where the user's stock interests can be inferred to be related to companies like Intel and AMD. In such cases, the structured data provided by the user can be entered or otherwise associated with a personal data book of the user (e.g., an address book, a financial portfolio, a discussion groups or blogs book, etc). Note that the user can also provide unstructured data that is converted into structured data at the back end of the processing system, which is also intended to be considered "structured data" for purposes herein. Structured data also includes data received by the user that can be harvested, such as information (e.g., addresses, stocks symbols) that are frequently included in emails received by the user. Such information may be noted as particularly meaningful if the user responds to those emails (or otherwise acknowledges receipt of that information in a meaningful way, such as saving the information to a file).

Usage data comprises any data that a user provides while browsing the Internet. For example, a user accesses an online directory of local restaurants, and then selects a "driving directions" link provided in one of the restaurant listings (instead of conducting a search using a map service). Thus, it can be inferred that the user intends to visit the address associated with that link (i.e., the restaurant), which gives that address a degree of significance to the user (e.g., the address can therefore be automatically harvested and added to the user's address book). Another example of usage data based on browsing activity is the user clicking on categories and then clicking on other data that is informative as to the user's interests within a selected category. User preferences and other user information can be inferred from that categorized data, where such preferences and user information can be used to automatically rank or otherwise valuate data for the user (e.g., for purposes of adding that data to a personal data book, or for an autocomplete function).

Metadata comprises any data that is implicit or part of the user's search query, browsing activity/selections, and/or usage that can be used to better understand and serve the user. Example metadata includes what time the user conducted the search and/or otherwise accessed the system (e.g., in the daytime during work hours, or in the evening during home-time), from what IP address the search query was transmitted (e.g., to indicate a geo code or lat/lon associated with that IP address), within what context was the search conducted (e.g., was the search for directions, stock information, etc), how important was the search to the user (e.g., did the user save the resulting directions to email or SMS message), what topics/services the user indicated in the search, and/or what searches/browsing the user carried out before and/or after the search/usage/selection.

Privacy of the user's personal data is maintained, while at the same time the user is relieved of the burden associated with updating and maintaining that personal data. The user may control how their personal information is collected, stored, and/or used.

General Overview

One embodiment of the present invention provides a client-server system for generating and maintaining personal data based on a person's Internet searches and/or browsing activity. In particular, the system implicitly generates and maintains that person's personal data based on information aggregated (e.g., incrementally) from data searches and/or browsing performed by the user. Data searches can be performed in a number of contexts, with each context providing useful information (e.g., search terms and associated metadata) that can be harvested, statistically aggregated, analyzed, and otherwise used to automatically provide the person with useful personal data. The personal data may be directly relevant to the context of the structured data search (e.g., where the generated personal data is stock portfolio data derived from financial searches conducted over the Internet), or indirectly relevant to the context of the structured data search (e.g., where the generated personal data is address book data derived from map searches conducted over the Internet). Browsing performed by the user can also indicate personal data, where data associated with mouse clicks or otherwise selected by the user (as opposed to entered for a structured data search) is collected. The generating and maintaining of personal data can be implemented on the server-side, client-side, or a combination thereof.

One such example embodiment is an address book generation system. The system implicitly generates and maintains a user's address book based on information aggregated (e.g., incrementally) from geographic data searches performed by the user. For instance, information is collected each time the user performs a geographic data search, such as a search for a location, landmark, or driving/walking directions using an online map service (e.g., Google Maps or MapQuest), or a search for local businesses or events using an online local search service (e.g., Google Local or Yahoo! Local). The addresses entered into such search services can then be associated with names (e.g., people or businesses), for example, using directory listing databases (e.g., white and/or yellow page databases). The address/name pairs can then be added to the user's address book. Metadata (e.g., time/day of search and user's IP address) associated with each search can be analyzed to infer various aspects of each address (such as importance to user).

The address book system can be fed using any number of client-server based communication techniques. In one particular embodiment, Asynchronous JavaScript and XML (Ajax) calls are used between the client and server, and address data can be stored/retrieved using conventional or custom database techniques. JavaScript can be used on the client-side for autocomplete functions (e.g., such as with Google Gmail) to make the user's address book more readily accessible. In addition, address entries in the address book can be ranked (e.g., incrementally) using various ranking signals of, for instance, emotional value, time decay, and seasonality. Also, a user's current and frequent geographic locations can be inferred from known data, such as that user's search history data, search time data, and HTTP header+ cookie data to be used for maps and other localizable services, such as ads, email, and internet searching. Such locality information can be used, for example, to add a dynamic quality to ranking and/or autocomplete functions (e.g., rankings and autocomplete choices for one location/time may be different for other locations/times).

As previously indicated, the underlying principles of the present invention can be applied to other products and services, such as online financial services, discussion and social groups services, bookmarks services, blog services, news search services (and other horizontal/topic specific search services), and even plain search services (e.g., general Internet search) as will be apparent in light of this disclosure. The present invention is not intended to be limited to address book generation. For example, in the context of finance, principles of the present invention can be used to generate a book or portfolio of finance entities in which the user is interested, such as exchanges (e.g., NYSE, OTC, etc), stocks (e.g., including company name, ticker symbol, and share price) mutual funds (e.g., including fund name, ticker symbol, and NAV), futures (e.g., including name of commodity, contracting parties, amount, specified price, and future transaction date), companies (e.g., company name and address of headquarters), and types of data about that company (e.g., links to news articles about quarterly reports and business transactions). Such information can be harvested from financial-based online searches conducted by the user, added to a financial portfolio for user, and/or dynamically ranked for portfolio display purposes. Similarly, and in the context of online discussion and social groups, blogs, news, and bookmarks, principles of the present invention can be used to generate a list or other representation of favorite groups, favorite friends, favorite blogs, favorite news sources, and favorite bookmarks, respectively. Further note that structured data as used herein is intended to include any structured data extracted from unstructured searches with/without context using available semantic analysis (e.g., clustering, synonyms) or other technologies for measuring connections between words (e.g., 'foods', 'travel', 'local').

In addition, since the data associated with such services (e.g., groups, blogs, etc) is typically organized in a hierarchical fashion, the system can infer which parts of the structured data hierarchy a user is preferential to, using aggregation and compaction techniques. For example, and in the context of online discussion groups, a user selection or "vote" for a science→biology→pachyderms may also be interpreted as a vote (perhaps of lesser magnitude) for biology and science, not just pachyderms. Thus, user interests can be noted and ranked accordingly (e.g., interest in pachyderms is high, while interest in science and biology is at least medium). Such user interests can be used in conjunction with other information known about the user, such as geographic location of user and time of day when user indicates the interest). For example, once a user's interests and location are known, related searches of interest can be suggested to the user when the user is at that location again and/or around the same time frame. Likewise, targeted ad placement and service offers can be made to the user relevant to the user's local geographic area. A similar analogy applies to finance contexts, blog contexts, and other services that provide a hierarchical scheme, where the hierarchy is telling of user interests. For example, a financial context search of semiconductors->chipmakers-> microprocessors indicates possible interest in chip makers like Intel or AMD by user, and further indicates a possible interest in makers of semiconductor processing equipment like Applied Materials and Lam Research; when such a search is conducted at a home location, then there is a further indication that materials geared toward do-it-yourself investing may also be of interest to the user; when such a search is conducted at a work location, then there is a further indication that materials geared toward professional investing services may also be of interest to the user). Also, implicit categories that the user does not see may be inferred. For example, a user may gravitate towards blogs from the east coast only, and an embodiment of the present invention can be configured to identify the user's interest in this implicit category by aggregating the metadata associated with the "addresses" indicted in the blogs (e.g., by virtue of the IP addresses themselves and/or geocodes associated with the blog IP addresses). Thus, other east coast blogs that may be of possible interest to the user can be suggested. Further note that other information, such as user locale and time, can be used to dynamically rank the blog suggestions provided to the user (e.g., if at home in the evening, then suggest blogs for east coast mountain climbing; if at work in the daytime, then suggest east coast blogs relevant to professional interests, such as object-oriented programming).

System Architecture

FIG. 1 is a block diagram of a system for generating and maintaining personal data, configured in accordance with one embodiment of the present invention. In this example, the personal data is address book data that includes names and addresses of people and/or businesses with which the user has relationships of one degree or another (e.g., good friends, work colleagues, or merely a business which the user has patronized). Other contact information may also be included in the address book data, such as email addresses and telephone numbers. Thus, the system can effectively be employed to provide an automatic address book service.

As can be seen, the system includes a client-server architecture, where the server-side communicates with one or more clients 125 via a network 120. The server-side includes a server system 105, an address book data module 110, and an address book generator module 115. On the client-side, each client 125 includes a browser 125a in which an address book module 130 is executing. The system automates a process of generating and maintaining a personal address book, by exploiting the insight that a person regularly indicates existing and/or potential entries of his address book (e.g., names and corresponding street addresses) via geographic data searches he executes, and via other communication such as browsing he performs (e.g., selecting a link associated with a street address) and emails he sends (e.g., email addresses may be previously associated with a street address in a user's email contacts). In addition, the value of each address to the person can be inferred based on, for example, how often and over what time an address is used.

The server system 105 can be, for example, a conventional or custom digital mapping system that allows clients 125 to request and receive driving directions and other geographic data. In one such particular embodiment, the server system 105 is implemented as described in U.S. application Ser. Nos. 11/088,542, filed Mar. 23, 2005, titled "Generating and Serving Tiles in a Digital Mapping System," and 11/051,534, filed Feb. 5, 2005, titled "A Digital Mapping System." Each of these applications, as well as their respective priority applications, are herein incorporated in their entirety by reference. In such a configuration, the server system 105 includes a web serving system, a tile serving system, and a location data serving system. The search data received by the server system 105 is parsed and broken down into constituent address components (e.g., "1600" "Amphitheatre Parkway" "Mountain View" and "CA"). This address component data can then be harvested for incorporation into the user's address book. Numerous mapping system configurations (whether tile-based or not) can be used in conjunction with an embodiment of the present invention, and the present invention is not intended to be limited to any one configuration.

In addition to mapping system functionality, the server system 105 enables communication between the client-side address book modules 130 and the server-side address book generator module 115 (and address book data module 110), via the network 120. Conventional or custom technology can be used to implement this communication. In one particular embodiment, Ajax calls are used to transfer address book entries between client 125 (browser 125a where address book module 130 is running) and the server system 105 (which is in communication with the address book generator module 115). As is known, Ajax can be used to send requests to a web server (e.g., included in server system 105) to retrieve only the data that is needed at the client (e.g., by the address book module 130), typically using SOAP (Simple Object Access Protocol) or other suitable XML-centric web services protocol. At the browser 125a on client 125, JavaScript or other suitable language can be used to process web server responses. The result is a simplified and more responsive user interface, since the amount of data exchanged between the web browser 125a and web server of server system 105 is reduced. Server-side processing time is also reduced, since client-side processing is employed. As will be discussed in turn, ranking and/or autocomplete functions can be used to further simplify access of the address book in module 130 and improve the user's experience. Thus, an incremental "real-time" update approach can be used, where the browser address book (or other personal data) is kept up-to-date using Ajax or similar technology. Likewise, the client can incrementally update the server using similar mechanisms. Likewise, multiple clients can auto-sync (to ensure consistent data on each of user's clients or between server and clients) incrementally using similar approach. Other communication techniques, such as HTTP/CGI (e.g., get and post commands) or WAP, can also be used.

In one such configuration, each address/entry in user's address book is assigned a unique ID. When a new address entry is added to the server-side address book (e.g., in database 110), that entry for the new address is sent to the client-side address book (e.g., in module 130). Also, if the rank of one or more addresses changes, for example, due to time decay or usage or due to change in user's locale, then an Ajax transmission can be used to send an array of only the address IDs and their corresponding revised ranks, from module 115 (via server system 105) to address book module 130. A similar approach can be used to communicate any data changes or other useful information from the server-side to the client-side (e.g., personal data or entries of any kind, ranking schemes, etc), or from the client-side to the server-side. In other embodiments, batch transmission of a user address book data is transferred in large chunks or in its entirety on a periodic schedule (e.g., once a day at midnight) using conventional data transfer techniques.

The address book generator module 115 receives data from the server system 105. This received data is from geographic data searches (e.g., driving directions, landmark locations, business locations, area maps, etc) performed by the user at client 125. The address book generator module 115 is programmed or otherwise configured for generating and maintaining the user's address book data based at least in part on that geographic search data, and storing the address book data in the database 110. For instance, consider the case where a user engages a digital mapping system to obtain driving directions from a start location to a stop location. The data input by the user into a "start address" field of the mapping system interface many times indicates the home/work address of the user (or in general the current location of the user), while data input by the user into an "end address" field of the mapping system interface indicates an address of interest to the user (such as a friend's home address or business address or a restaurant's address). In one such case, the address book generator module 115 uses the "end address" data entered by the user to populate the user's address book. In addition, if the most recent addresses used as "start" addresses are a specific address, then the user is likely very interested in local businesses and facilities near that specific address (e.g., if the user has used the specific address three times out of the last five searches). The module 115 can further be configured with (or otherwise have access to) residential and business address listings to match a name (e.g., name of friend, business contact, or restaurant) to the harvested address of interest, and create an entry in the user's address book. In addition, in the event that only a partial street address is extracted, the module 115 can further be configured to further use such residential and business address listings (and/or any other address-centric database, such as zip code databases) to identify missing components of address information (e.g., if only a zip code is harvested, then identify the corresponding town/city and state; if only a street name and number along with a zip code are harvested, then identify the corresponding town/city and state). Any identified missing components can then be added to the address book entry. Other contact information (e.g., email address, telephone) can also be identified (from any available sources) and added to the entry.

The geographic search data, search metadata, and/or browsing-based data can also be used in maintaining address book entries, and for purposes of assessing parameters such as accuracy, value, and rank of each address. For instance, the address book generator module 115 may be further programmed or otherwise configured to store ranking signals associated with each address (e.g., incrementally, so as to refine the ranking signals as additional data is collected), and store this ranking signal data in association with such addresses so that at any given time and place, the address book service can generate an address book in the order that the user is likely to want (e.g., where each address entry is ranked based on its associated ranking signals and data associated with the particular request). For instance, the rank order may be based on the current time the user accesses the address book, and/or from what address or locality, and/or the context of the particular request. For example, nighttime or weekend access from home will generate an address book where social contacts are given top order, and daytime access from work will generate an address book where professional contacts are given top order. With regard to a context driven rank, a different rank can be assigned for different input fields (e.g., in a financial application, if the user is filling their billing address, rank home addresses higher; but for daytime phone number, rank work numbers higher). Note that concepts such as night/day, weekend/weekday can be learnt in a purely statistical manner, and are therefore culture/country/personal habit independent. If there is a pattern, the ranking signals will statistically capture that behavior. Further note that the ranking signals in the address book of module 130 can be changed or refined based on, for example, recent usage and/or browser/http header metadata. Also, the module 115 can be configured to use the address book in conjunction with metadata in a user request (e.g., IP address, time of request) to guess with high accuracy the user's current locale (e.g., location within a given uncertainty circle). The address book generator module 115 is discussed in more detail with reference to FIGS. 2 and 4 through 7.

The server system 105 may also be configured to store data from geographic data searches (performed by the user) in the database 110 directly (as opposed to via module 115), if so desired. The address book database 110 can be implemented with conventional or custom database techniques or other storage mechanisms. In one embodiment, database 110 is implemented as a scalable low latency backend store configured to enable the storage, retrieval, updating/modifying, and deletion of user information by service (where Google Local, Google Search, Google Maps, Google Blogs, etc provided by Google, Inc., of Mountain View, Calif., are each an example service) and/or by user (e.g., based on user ID or user address). In one such configuration, database 110 supports login sessions. In particular, a user logs into database 110 by supplying a username and corresponding password. In response, the user receives a token identifying that they have logged in correctly. Session tokens can be implemented, for example, by setting a cookie in the user's browser that will get delivered to all client service web servers that use database 110 (as well as directly to database 110 web servers, such as in server system 105). In this way, any client service is able to make an API call to database 110 on every user request, passing along the received session token and asking database 110 to identify the user and report on whether the session is valid (e.g., not expired). In such an embodiment, the database 110 provides client services with the ability to store service-specific data (as well as retrieve, update, modify delete data), on a per-user and/or per-service basis. Storage space allocated per user can be, for example, 1 to 100 Kbytes (or more if so desired). As database 110 stores valuable and private user data, security mechanisms and policies (e.g., encryption and authentication schemes) can be implemented that guard against theft or inappropriate use of user data. The database 110 can be configured to provide various API calls. For instance, one API call could do strict lookups and updates, which give one-copy-serializability semantics. Strict lookups return the most recent updated value. Strict updates only return once the data is protected from failures, and they guarantee that the updated value is available to later lookups. Because the strict operations can become unavailable in some failure scenarios, database 110 can also be configured to provide "stale lookups" and "lazy updates." A stale lookup can return data that is out-of-date. A lazy update has some probability (hopefully low) of losing data in a failure, and later lookups may not see the effect of the update for some time. These semantics may be useful to some services that need the higher availability. In one particular embodiment, database 110 and access thereto is implemented as described in U.S. application Ser. No. 11/097,884, filed Mar. 31, 2005, and titled "Systems and Methods for Providing Subscription-Based Personalization" (e.g., see FIG. 1 and database 116 therein). In one such case, data is stored in database 110 (which can be referred to more generally as a personal data store) as described in U.S. application Ser. No. 11/197,925, filed Aug. 5, 2005, and titled "Large Scale Data Storage in Sparse Tables." Each of these applications, as well as their respective related and priority applications, are herein incorporated in their entirety by reference.

Thus, in this example embodiment, where the personal data in the form of an address book, database 110 (and access thereto) can be implemented to store/retrieve addresses or an address book while a user request for the associated service (e.g., Google Maps) is processed. The address data or book can be retrieved by a client 125 from the server system 105 in its entirety, or incrementally as changes occur (e.g., using Ajax calls as previous discussed). Various trade-offs can be considered when implementing the backend stored, and the actual implementation will depend upon the particular application and desired performance. For example, some techniques allow for storing of smaller amounts of user data with very high (e.g., bank level) transaction integrity, while other techniques allow for storing of large amounts of user data with lesser transaction integrity.

The server-side architecture and functionality will vary from one embodiment to the next, as will be apparent in light of this disclosure. For instance, the address book generator module 115 and/or database 110 can be integrated into the server system 105. Likewise, the database 110 can be integrated into the address book generator module 115. Also, a distributed database scheme can also be used. Other server-side functionality and structure, such as scalability, load balancing, redundancy, and failover capability, may also be included using conventional or custom technology. Also, serving systems other than those (or in addition to those) configured with mapping systems may be used, depending on the type of personal data being generated and maintained by module 115, as will be apparent in light of this disclosure. For instance, the serving system 105 may also include a general search engine service (e.g., Google Search, etc). Note that such general search services can be programmed or otherwise configured to provide links to more specific services of interest, based on the user's search query (e.g., if a user enters an address, the first link in the search queue can be for a digital mapping service). In this sense, the server system 120 may represent a number of integrated online services (e.g., Google Search, Google Maps, Google Earth, Google Local, Google Groups, Google Blog Search, Google Mail, Google Images, Google News, Google SMS, Google Mobile Search, Google Answers, Google Directory, etc) from which structured data searches (and/or other online activity, such as browsing) carried out by the user can be used to provide the user with a personal data service.

The network 120 may be any type of communications network, such as a local area network (e.g., intranet), wide area network (e.g., Internet), or some combination thereof. Alternatively, the network 120 may be a direct connection between a client 125 and the server system 105. In general, communication between the server system 105 and a client 125 can be implemented via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

A client 125 on which the address book module 130 runs can be, for example, a desktop or laptop computer. Alternatively, a client 125 can be a wireless device, such as a personal digital assistant (PDA) or other such computing device (e.g., smart phone). In short, the client 125 in this particular example can be any computer or device that can execute the address book module 130, and allows the user to interact with the server system 105, so that geographic data searches can be used to generate address book data for the user. In one particular embodiment, the address book module 130 runs as an applet within the browser 125*a*. In this case, the browser 125 is applet-enabled and can be, for example, Microsoft's Internet Explorer browser, Netscape's Navigator browser, Mozilla's Firefox browser, OpenWave's mobile computing browser, or any other browsing or application software capable of communicating with a server via a network. As previously explained, the present invention is not intended to be limited to an address book service. Thus, in a broader sense, the client 125 can be any computer or device that can execute a personal data module configured in accordance with an embodiment of the present invention, and allows the user to interact with the server system 105, so that structured data searches and/or browsing activity can be used to generate personal data for the user.

Depending on the system configuration, the functionality of the address book module 130 will vary. For instance, in one embodiment, all searching functionality and address generation/maintenance functionality is carried out on the server-side, and the address book module 130 on the client-side receives address book entries from the server-side (e.g., in batch or incrementally) and stores them in its local address book. The address book module 130 on the client-side may be further configured to carry out other functionality as well, such as an autocomplete function and/or a selective display function, as will be discussed in turn. In alternative embodiments, the address book module 130 is configured with some or all of the searching functionality and address generation/maintenance functionality discussed with reference to the server-side. The address book module 130 is discussed in more detail with reference to FIGS. 3*a*, 3*b* and 4 through 7.

Just as with the server-side architecture, the client-side architecture and functionality may also vary from one embodiment to the next. For instance, the address book module 130 can exist independently of the browser 125*a* (e.g., as an executable application stored on client 125 and configured to harvest structured search data from geographic data searches conducted by the user from the browser 125*a*, so that personal data generation can be carried out as described herein). Also, clients configured with personal data modules other than address book modules (e.g., such as a stock portfolio module, favorite blogs book module, favorite groups book module, etc) may be implemented in accordance with embodiments of the present invention, depending on the type of structured data and/or browsing activity being provided to the user, as will be apparent in light of this disclosure.

Other system architectures will be apparent in light to this disclosure. For example, consider a system where the user can interact with that system via her telephone (e.g., cell phone, home phone, smartphone) or any other electronic input/output device, whether mobile or not. In such a system, the user's communication device can be thought of as the client-side, and the service being dialed into or otherwise accessed can be thought of as the server-side. The communication link between the communicating devices can be implemented with any number of technologies (e.g., GSM or VoIP), and may carry any type of data (e.g., voice, data). The mode of input/output between the communication devices can be speech and/or data based (e.g., IVR with voice and/or touch-tone interface).

Server-Side Personal Data Generation

Figure 2:
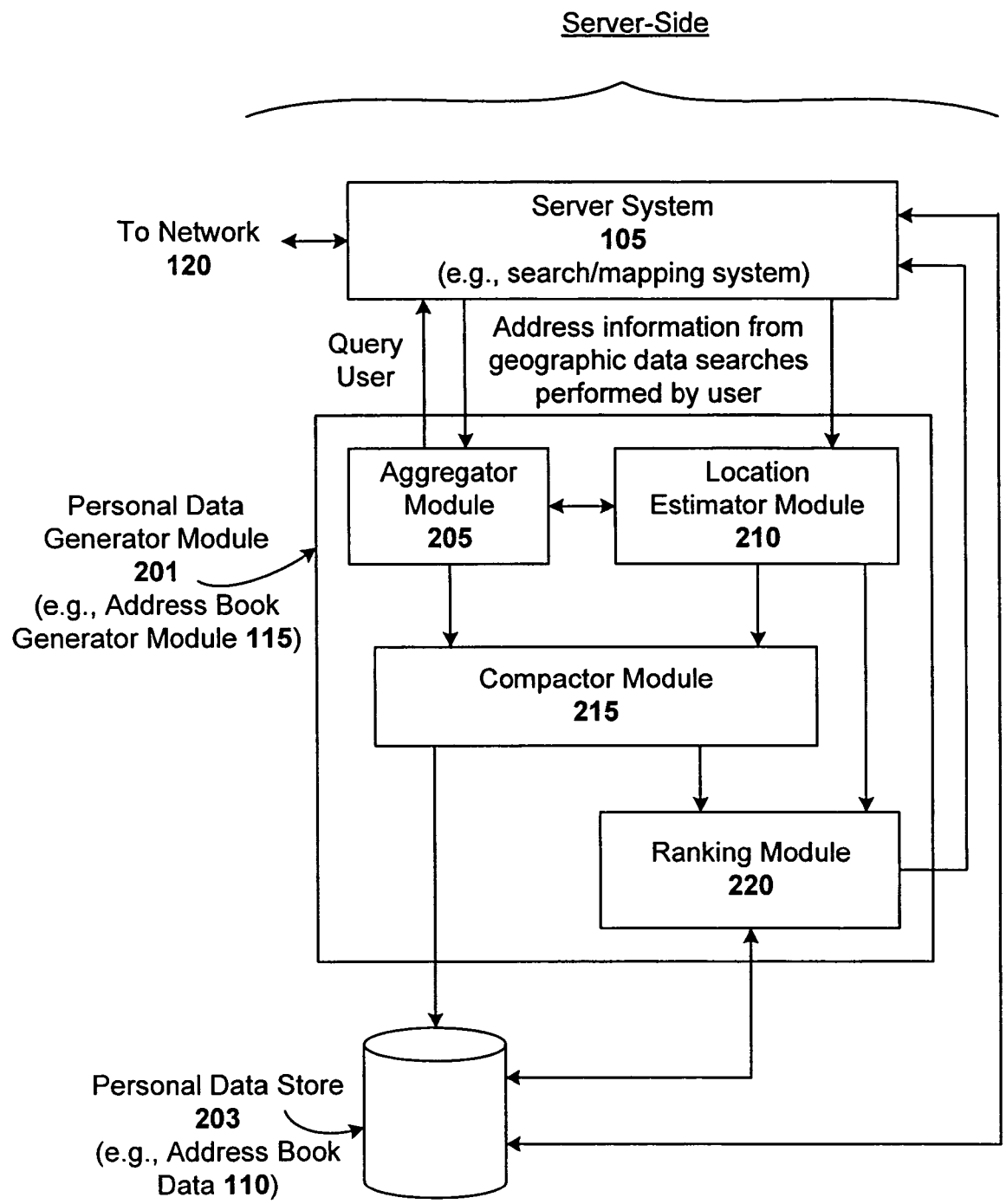
FIG. 2 is a block diagram of a server-side personal data generator module, such as the address book generator module shown in FIG. 1, configured in accordance with one embodiment of the present invention.

FIG. 2 is a block diagram of a server-side personal data generator module, such as the address book generator module 115 shown in FIG. 1, configured in accordance with one embodiment of the present invention. As can be seen, data from geographic data searches performed by the user is harvested from the server system 105 by the personal data generator module 201. The module 201 then generates entries, and stores them in the personal data store 203.

For purposes of this discussion, assume that the personal data generator module 201 is implemented as the address book generator module 115 discussed with reference to FIG. 1, and that the personal data store 203 is implemented as database 110 discussed with reference to FIG. 1. In this case, the module 115 generates address book entries, and stores address book data in the database 110. It will be appreciated that the address book generator module 115 is a specific embodiment of the personal data generator module 201, and that database 110 is a specific embodiment of the personal data store 203. Other implementations of module 201 and data store 203 will be apparent in light of this disclosure.

In this example configuration, the address book generator module 115 includes an aggregator module 205, a location estimator module 210, a compactor module 215, and an address ranking module 220. Each of these modules can be implemented, for example, in software (e.g., C, C++, Java, or other suitable programming language), hardware (e.g., gate level logic or ASIC), firmware (e.g., microcontroller configured with I/O capability for receiving data from server 105 and a number of routines for carrying out aggregation, location estimation, compacting, storing/accessing, and ranking functions as described herein), or some combination thereof. In addition, note that the modules are shown as separate for purposes of illustration, and that other embodiments may have the various functionalities or sub-sets thereof integrated into a single module or parallel processing and/or pipelined architecture.

The aggregator module 205 is programmed or otherwise configured to provide total recall. In one particular embodiment, the aggregator module 205 collects all addresses input by the user when requesting geographic data searches (e.g., such as the addresses input by the user when using Google Local, Google Search, Google Earth, and Google Maps), including metadata for each search/address. This metadata includes, for example, the search or service with which the address was used, time of search, IP address included in the user's request, other request header data (e.g., http header and cookie). Such data, as well as other collected data (e.g., usage data based on browsing activity) can be used as ranking signals (or to derive ranking signals), which are assigned to the harvested address (ranking signal generation and assignment are performed by the compactor module 215 in this particular embodiment, and will be discussed in turn). Certain signals may be global or address independent (e.g., frequent locations, times of use of a certain service or other data aggregated across addresses or groupings thereof). This address data can then be processed and stored (as entries in an address book) in such a way that any service can access all or part of the address book both in real-time (incrementally, at each request as needed) and offline (e.g. batch processing), as will be appreciated in light of this disclosure. In one particular embodiment, the aggregator module 205 is further configured to assign labels for each address (e.g., "home," "work," and/or name of the person or business associated with that address). The labels can be obtained, for example, through explicit action (e.g., querying user for label) and/or implicitly (e.g., based on user's email/contact history, and/or user's locality). Another way to match harvested addresses to a name is by the aggregator module 205 accessing one or more directory listing databases to identify a listing that matches the captured addresses. Other embodiments of the aggregator module 205 may just collect addresses entered by the user in geographic data searches, and then match those addresses to a name to create entries in the user's address book (e.g., no use of metadata for ranking/valuing and other user interface enhancements, such as autocomplete). The aggregator module 205 may also be configured to collect usage data that a user provides while browsing, such as when a user selects a "driving directions" link. Here, the aggregator module 205 can harvest address information associated with the driving directions, and use that address information for address book entries. In one such embodiment, data scraping and/or optical character recognition techniques can be used to harvest the associated address information, if it is not already known.

The compactor module 215 is programmed or otherwise configured to provide compact recall, and to generate or otherwise assign ranking signals that help rank the addresses in future usage of the particular address or address book. In one particular embodiment, the compactor module 215 compacts the entire address search history (including metadata, labels, ranking signals, etc) into one entry per distinct address. The compacted information can then be used by the ranking module 220, as will be explained in turn. The compacting can be implemented using various types and/or combinations of statistical aggregation to generate and maintain address data (including ranking signals) that is likely to be used by the user.

For instance, a statistical aggregate of cyclicity (e.g., Gaussian or other normal distribution) with a day and/or week period can be used to indicate what times of the day/week/year a particular address was used. Cyclicity of addresses can be derived by determining daily, weekly, and annual/seasonal cycles for each address. But since these seasonal variables (and other signals discussed herein) used for ranking are circular in nature, normal Gaussian distribution will not work when the day/week or year rolls over. One approach is to use the Von Mises or Poisson or other distributions. However most of these methods can only process data in a batch form (i.e., for each new usage of an address, the distribution needs to be recomputed, which means all previous data needs to be remembered). The other drawbacks are restrictions on the distribution (e.g., normal/uniform). An alternate approach is to use vector quantization. In particular, the day/week/year can be broken-up into a finite number of bins (time slices), and for each usage of the address (or occurrence in personal data), accumulate a value in the daily/weekly/yearly bins corresponding to that time. This value can be modulated based on emotional rank of that usage, type of usage/occurrence, max accumulated in a given time and other signals. This distribution can now incrementally (in real-time) accumulate statistics for circular variables occurring in any or unknown distribution, with the further advantage that the memory footprint of this distribution can be tailored by varying the number of bins and data stored per bin to approach that of a simple Gaussian distribution with minimal loss of fidelity. The number of bins and size can be uniform or non-uniform and determined based on criteria like Nyquist's theorem, desired signal fidelity, and signal nature. Note also that 'day,' 'week,' and 'year' are periods typically used and depending on the application other periods can be used as well. For instance, the compactor module 215 can determine the statistical distribution of address usage over a day (daily cycle) by taking the modulo of the usage time/times-in-a-day, and develop a distribution such as the one described. In one embodiment, the compactor module 215 is configured for: vector quantizing the day into short buckets (e.g., 15 minutes), and incrementing a bucket by one for every search during that time of the day (example variants are to increment at most once every period, e.g., 15 minutes, and/or increment by value of search to the user, e.g., based on rank developed elsewhere); using an incremental version of the normal distribution modified to take the circularity of the day into account. Similarly, the compactor module 215 can determine the statistical distribution of address usage over a week (weekly cycle) by taking the modulo of the usage time/times-in-a-week, and develop a distribution. The compactor module 215 can determine the statistical distribution of address usage over a year or other long periods (yearly/seasonal cycle) by using a (sparse) usage array/vector quantized by each week (e.g., using a weekly counter, where each count represents a use/access, whether one per day and/or a modulo usage value as described for daily cycles). The sparse array/vector captures the distribution completely while being more compact when many or most of the addresses rarely get used (e.g., personal addresses). This sparse array approach can be used as a variant of the vector quantization approach to reduce storage further for certain variables where the quanta are large and few are filled. Such usage information can be used to infer what addresses the user is most likely to want, depending on the time of day, week, and/or season. For instance, addresses associated with social contacts will typically be accessed on weekends and nights, while addresses associated with professional contacts will typically be accessed during week days (assuming a 9 to 5 work week). In this sense, "address seasonality" is determined by the compactor module 215.

Other signals that can be accumulated statistically, not circular, and known/expected to be of normal distribution, can use an incremental Gaussian and other such incremental distributions that are mathematically sound when used incrementally. A general method for incrementally (and if needed in real-time) accumulating temporal statistics can be employed. In this method, each variable is associated with one or more of the following: a daily vector, weekly vector, yearly (sparse) vector, and vectors for any other period of interest. These vectors accumulate the count and/or value of the signal as it occurs. Overall signal statistics can also be tracked using incremental Gaussians or other approaches. Signals about recent behavior can be used to capture or boost recent phenomenon or to account for changing interests. Depending on the application a rolling vector of recent readings binned by hour/day/week or other time periods can be used. This vector can, for example, be used to compute statistics of the signal within in the recent period(s) and cross-correlate with other signals in the same recent period(s). An alternate method is to use numerical low pass filters (or aging techniques as described herein). The resulting generalized signal can then be configured as a computational 'service' which, when applied to any/all personal data, can automatically generate a sense of importance and value to the user of that piece of personal data. Thus, there are a number or techniques that can be used for automatically tracking temporal signals associated with personal data. Such signals can then be used, for example, to display/autocomplete/autofill/share the associated personal data in user interfaces or applications.

A statistical aggregate of IP address ranges associated with a particular address can also be output by the compactor module 215 using, for example, standard IP address compaction techniques and variants including tries (as is known, a trie is an ordered tree data structure that is used to store strings) associated with those methods. In one particular embodiment, the location estimator module 210 is programmed or otherwise configured to collect and store all IP addresses from which the user requests a particular address, where that particular address is set as the "start address" (when the user is using map/direction search services) or "search from" address (when the user is using other structured search data services, such as discussion/social group services, finance services, blog services, etc). When the list of IP addresses for any one address becomes long (e.g., greater than five IP addresses), the compactor module 215 is programmed or otherwise configured to compact that list using IP address masks. If there are multiple masks, module 215 keeps a trie of the masks, along with address ranges within the masks (e.g., 192.168.2.*+'100 to 110'). IP addresses are typically associated with a geo code (or other indicator of geographic location). Thus, the geographic location of the user can be estimated. From this location information, inferences can be drawn as how to best present relevant personal data to the user, as will be discussed in reference to the location estimator module 210. The statistical aggregation of IP addresses can also be carried out module 210, as will be appreciated. Thus, one embodiment of the present invention determines a user's location (or ranking an address higher/lower) based on usage of geo addresses on particular machines, and more generally associates personal data with particular IP addresses and/or geographic locations.

A statistical aggregate of usage history associated with a particular address can also be output by the compactor module 215. For instance, a statistical aggregate of address usage history can be implemented by storing a Boolean/bit vector for each type of usage and/or storing counters for each type of storage (to indicate frequency of usage type) and/or storing time decayed counters (to indicate how long ago that a particular address was initially stored). Such usage information is helpful, for example, in assessing rank and personal value of the corresponding address (e.g., addresses initially saved a long time ago that have been infrequently used are probably less valuable to the user than long held and frequently used addresses).

The compactor module 215 can also be programmed or otherwise configured to eliminate duplicates entries for the same address. For instance, the compactor module 215 can merge information from two addresses (e.g., one older address and one newer address) into a single entry if the corresponding canonical addresses (i.e., the machine rewritten form of the address) are identical. Likewise, the compactor module 215 can merge information from the two addresses into a single entry if the latitude/longitude (lat/lon) values of the two addresses are identical and a Levenshtein distance (or other edit distance technique for finding similarity of words or strings) between the older address and the newer address is small, or if some function is below a threshold. For instance, assume: abs(sum)=>f(lat/lon distance, Levenshtein distance)=a1*abs(lat/lon distance)+a2*abs(Levenshtein distance), where a1, a2 are weighting constants. Instead of using abs, use: any k norm=>(a1*(lat/lon distance)$^k$+a2*(Levenshtein distance)$^k$)$^{(1/k)}$, where k equals 0 . . . infinity. Note that the Levenshtein distance can be applied to the entire address or different parts of it (e.g., the address and the label). The Levenshtein Distance can also be modified to use synonym knowledge to move synonym's closer for non-nouns. By ignoring the specifics of lat/lon and replacing with matches of other available structured data, this modified technique generalizes for all structured search queries. Another variant is to use polynomials of the above instead of just one factor. Other error functions can also be used, where the error function is 0 when there is a perfect match and increase monotonically as the addresses become more distant or different. Note that the compactor module 215 can also be programmed or otherwise configured to account for aliases in names of cities (e.g., NYC=New York City=NY City), states (e.g., CA=California=Cal.), etc, as well as common variations on address terms like street, avenue, boulevard, etc. Such techniques can be used to determine address identity with high confidence.

Thus, the aggregator module 205 and the compactor module 215 operate together to allow generation and compaction of address book entries based on structured search data (including search metadata) input by a user. The structured search data can be from multiple sources and multiple online services, such as map services (e.g., Google Maps, Yahoo! Maps, Google Earth, MSN Virtual Earth, etc), local services (e.g., Google Local, Yahoo! Local, MSN Local, etc), discussion groups (e.g., Google Groups, Yahoo! Groups, MSN Groups, etc), social groups (e.g., Google's orkut). Note that functionality of the aggregator module 205 and the compactor module 215 can be integrated into a single module, if so desired.

Other sources of structured search data will be apparent in light of this disclosure, such as services like email, blogs, instant messaging or SMS, financial services, and any online service where the user transmits structured search data to a server or other remote application where the structured search data (and its metadata) can be harvested to develop personal data for the user. This harvesting functionality can also be applied at the client, where any such data received by the user as part of a service (e.g., email or IM service) can be harvested to develop personal data for the user. In any case, the aggregator module 205 and/or the compactor module 215 can be configured to auto-populate a user's address book. In one such embodiment, the aggregator module 205 is further configured for scraping user data from other sources such as email contacts, and frequently browsed contact pages (e.g., business pages), to acquire address data and/or names to go with the address data. The compactor module 215 can then run the scraped addresses through a geocoder (to estimate lat/lon of address) to canonicalize and complete the address (if necessary).

Further note that address data can be pushed from the address book generation system into other systems, such as the contacts list of the user's email system. For instance, a conventional auto-merge function can be used, where addresses of the user's address book are merged with contacts in other services (e.g., email) based on labels, partial or whole address matches, and/or phone number of contact. A user interface (UI) can be provided at the client 125, to allow the user to associate addresses from the address book (e.g., in module 130) with the user's email contacts list. In one such embodiment, addresses can be labeled online (e.g., by the user via a UI), or after the fact in an automatic inference-based labeling process (e.g., by the aggregator module 205) from other available user data. For instance, if person B receives five emails from person A, and all of those emails contain the same sign-off address at the bottom, then it can be inferred that the consistently used sign-off address is person B's work or home address. Thus, when the address is stored in the address book (e.g., database 110), the system (e.g., aggregator module 205) labels that address with person B's name from the user's contacts list. In addition, each access of an address in the address book, or of a contact or other personal data entity associated with an address in the address book, can be stored and for statistical accumulation/ranking purposes. In addition, the receipt of the same embedded addresses (e.g., received 5 times) can be used as a signal to rank corresponding the address book entry if it is already there or when it is added. Same goes for other personal data book applications. For instance, if the user frequently corresponds (e.g., via email or IM) about a particular stock, then it is likely that stock is important to the user. The rank signal for that stock (or other data of interest) could be significantly boosted if the user replies to such messages, or explicitly includes that stock in his future correspondence.

Note that the functionality described herein can be implemented on the server-side, the client-side, or a combination of the two depending on the system architecture, as will be apparent in light of this disclosure. For example, if the aggregator module 215 is on the server-side (as shown in FIG. 2), then the module 215 can either access the user's contacts and/or emails via a query to the client-side personal data module 301 (e.g., which can be programmed or otherwise configured to search the contacts/emails for the requested data), or by accessing a backend server that also includes the user's contacts/emails. Alternatively, if the aggregator module 215 is on the client-side (as shown in FIG. 3b), then the module 215 can locally access the user's contacts and/or emails, or query the server system 105 for the information. Regardless of where the functional modules such as module 215 are located, a UI at the client-side can be configured to allow the user to engage and interact with the system.

The location estimator module 210 is programmed or otherwise configured to estimate the user's frequent physical locations. Such information can be used, for example, in a dynamic ranking process. In this particular embodiment, and as previously explained, the location estimator module 210 stores IP addresses associated with user actions that indicate the user is at a particular location (e.g., module 210 can receive IP addresses directly from server system 105 and/or from module 205). For example, the location estimator module 210 stores IP addresses from which the user requests a particular address, where that particular address is set as the "start address" (e.g., driving directions search services) or "search from" address (e.g., general Internet search). Likewise, the location estimator module 210 stores IP addresses from which the user requests a particular address, where that particular address is set as the "end address" (e.g., driving directions search services), and the user then sends (e.g., via email) those directions to another person (e.g., sending a friend driving directions to your house). IP addresses associated with other user actions that indicate the user is at a particular location can also be used.

The location estimator module 210 can be further configured to estimate the user's location, for example, based on IP address, especially if an IP address is within an IP address mask as previously described with reference to the compactor module 215. Note that the statistical aggregation of IP address ranges associated with a particular address discussed with reference to the compactor module 215 can be carried out by the location estimator module 210 (e.g., in one particular embodiment, the location estimator module 210 is integrated into the compactor module 215). In any case, if an IP address associated with a user 'matches' (whether a direct match or by way of a mask) one of the stored IP addresses or masks, then that IP address is one that provides a strong signal (e.g. based on multiple from searches) as to where the user is physically located at the time the search was conducted. As previously noted, IP addresses are typically associated with a geo code or other indicator of geographic location. Such geographic location information can be used, for example, to infer the location (e.g., home or work) from where the user conducts searches.

Once this location information is known, address ranking and/or autocomplete schemes can be configured to dynamically adjust based on the user's location. For example, the user's top ten addresses at work (e.g., at an IP address that matches a "work" IP address mask, typically between 8 am and 6 pm) may be very different than the top ten addresses used at home (e.g., at an IP address that matches a "home" IP address mask, typically from 6 pm to 8 am). If at a work locality, then address ranking and/or autocomplete functions can favor work related addresses. Likewise, if at a home locality, then address ranking and/or autocomplete functions can favor home related addresses. In a similar fashion, the time of day (or season, etc) at which a user is accessing the address book (or other personal data) can be used to effect a ranking and/or autocomplete scheme. In one particular embodiment, location estimator module 210 assigns a label to entries in the address book, based on the estimated location of the user when accessing those entries (e.g., entries accessed at work are assigned a "work" label, while entries accessed at home are assigned a "home" label).

Other functions can also be implemented once the locality of the user is known. For instance, in a mapping system application as the one shown in FIG. 1, when the user accesses the server system 105 from a known locality, the server system 105 can automatically generate a default map or viewport of the user's estimated locality, along with a default address in the "search address." In accordance with one particular embodiment of a dynamic ranking scheme, rank of an address can be reduced as the address gets farther and farther away from the user's current known locality. Likewise, any form accessed by the user can be generated with default data based on the user's personal data. Also, geo-targeted ads are enabled for all services associated with the personal data system. Likewise, geo-targeted news, weather, movies and other entertainment, and other useful information are also enabled for the personal data system.

Similarly, service of local TV listings to the client 125 is enabled. In general, any geo-targeted services are enabled. Further, note that the geo-targeting can be used in conjunction with dynamic ranking based on user interests (e.g., as indicated by browsing activity). In one particular embodiment, a number of user estimated locations (e.g., 2) can be pushed to a super short cookie to allow ad targeting without accessing the backend (server system 105). Such local ad targeting comes at zero cost (in terms of service latency). In such a case, the cookie could be encrypted and short for security purposes. Reducing latency associated with ad-targeting a user allows for serving of relevant ads without losing performance or ad-context.

Thus, the location estimator module 210 can estimate the locality of a user, and then provides that estimate (e.g., and related information, such as IP address masks, address listing labels, etc) to the compactor module 215 to be compacted with other pertinent data, so that compact entries can be stored in the address book data database 110. In the embodiment shown, the location estimator module 210 also provides its data (or a subset thereof, such as the estimated locality and the label associated with each locality) to the ranking module 220, so that ranking can be carried out based on the user's estimated locality (as well as other user data).

The ranking module 220 is programmed or otherwise configured to develop a rank that reflects a value of an address to the user based on multiple signals, which are generated and/or assigned by the compactor module 215, as previously discussed. As previously described, these multiple signals (e.g., location of user, usage data, time of searches and/or subsequent accesses (of personal data), context of searches, and other metadata) are harvested by modules 205 and/or 210, and then compacted by module 215 into entries into the database 110 (or other personal data storage). The ranking module 220 can access these entries in database 110, and compute ranks for each associated address, as subsequent accesses of the system by the user occur.

The ranking module 220 is flexible, and can also generate ranking orders based on the usage context. In such an embodiment, the ranking module 220 accesses one or more ranking signals associated with an address entry in data store 203 (or other personal data entry), so that generating different rankings for each address usage type is a matter of defining different ranking functions for different usages, where such functions can be hand-crafted or learnt. Machine learning, (non)linear regression or optimization techniques can be used to auto-generate the functions (or their parameters) using user supplied data points (e.g., whenever the user selects an address, in the ideal function, that address would be at or near the top in rank). The ranking module 220 can also be programmed or otherwise configured to generate ranking signals based on data associated with an entry in data store 203. For instance, in one embodiment, the ranking module 220 assigns a different emotional value for each different type of address usage (e.g., based on context, type of search, etc). For example, a "start address" is assigned a high emotional value, while an "end address" is assigned a lower emotional value. In a more general sense, the rank order for 'search near' address input (e.g., indicates location of the user's home or work) is different than the rank order for 'directions from' (e.g., indicates current location in trying to get to home or work) is different than the rank order for 'directions to' (e.g., indicates recent/new addresses used). Also, if a user requests many sets of directions (e.g., 5 or more sets) using a particular address, then that user likely knows the surrounding area well, so there is an emotional attachment in this sense (or simply relevance to the user). Likewise, if a user uses a particular address for nearby searches for an extended period of time (e.g., 1 year or longer), then that address has an emotional value to the user (e.g., dorm, girlfriend's place, home, etc). When the emotional value modulo history exceeds a certain value, the ranking module 220 can automark that address with an indicator (e.g., star) or protect it so that it is prioritized high and/or never deleted. This emotional/relevance ranking allows users to preserve all their former home/work addresses, which has a high administrative value. In particular, if a user changes out a client 125 (e.g., previous computer dies or is updated to a newer model), each of the user's previous home/work addresses are preserved on the server-side in the database 110 (in accordance with their relatively high rank assigned by the ranking module 220). Thus, the new computer on the client-side can always be updated. In addition, the user is not required to remember or even research their previous home addresses or work addresses from many years ago. Such information is commonly required for a number of forms (e.g., such as forms for bank loans, taxes, job applications, credit card applications, etc).

In one particular embodiment, the system of FIG. 2 effectively operates as an address storage vault that can be used to allow other services to preserve/organize all types of personal information associated with each historical address (e.g., utility account numbers and other accounts/bills, telephone numbers, services, etc). Such data again can have significant administrative value, for example, when filing a tax return or when buying a home, and for other form-intensive processes that typically ask for such historical personal data. In short, such personal data can be preserved and indexed via street address (or other appropriate indexing scheme) for the user's future reference. Further, note that many such processes that require that type of information can now be carried out in an online forms driven manner (e.g., applying for a bank loan over the Internet). Autocomplete and/or default data functions can be used by various online services (at the approval of user) to access the user's personal data vault to assist the user in completing the online forms.

For instance, if the target service being used by the user is related to the vault service (e.g., such as in the example case of a Google group service and a Google personal data vault service), and the user has granted permission for the related services to share information, then the target service can access the user's personal data from the related vault service and automatically enter that data into the target service's online forms prior to serving those forms to the user, thereby reducing the user's data entry burden. Alternatively, a personal data module executing on the client-side of the system can be programmed or otherwise configured to detect when the user has accessed online forms, and to interrogate each form to determine what information is being requested (e.g., by interpreting form tags that indicate "current address" "previous address #1" "previous address #2" etc). The personal data module executing on the client can then access the user's personal data vault (e.g., via network 120 and server system 105), and retrieve the requested data. Such a client-side personal data module is particularly useful when the service being used by the user is not related to the vault service, or simply when the user has not granted access to any services to their personal data stored in their vault (e.g., which can be implemented in the address book data 110 or other personal data store 203).

The ranking module 220 can also (or alternatively) be configured to calculate a usage-based rank for each address in the user's address book. This rank can be based on the number of times the address is used by the user (e.g., which is one of the ranking signals aggregated and compacted into an entry for each address). This usage rank can be maintained by aging each usage and reducing associated value over time. Thus, older uses of an address combined with infrequent use will provide a lower usage rank than addresses that are frequently used over a long period of time. In one particular embodiment, the ranking module 220 is configured to apply an incremental aging formula that incrementally ages the aggregate rank of an address using an exponential decay function so that the multiple incremental usage agings are the same as aging each address access separately using the property $e^{(-t1)}*e^{(-t2)}=e^{(-(t1+t2))}$. Here, if t1 and t2 refer to time constants, applying the decay incrementally to an aggregate rank $R=R_{old}*e^{(-deltaT)}+r1+r2$ is the same as keeping track of each access separately and decaying them separately. Such an embodiment compacts the rank data significantly without losing the decay property of the independent signals. Thus, an approach to aging signals and their combinations incrementally, especially without losing overall temporal quality (e.g., $Age(\Delta t_1+\Delta t_2)=f(Age(\Delta t_1), Age(\Delta t_2)$, and $Age(a$ at $t_a$, b at $t_b$, ...)=$g(Age(a$ at $t_a), Age(b$ at $t_b)$, etc) is provided.

The ranking module 220 can also be configured to limit accumulation of emotional value as a function of time. This limitation captures the notion that no matter how many times a user uses an address in a given day, its emotional value to the user may be limited. In one such embodiment, this function is modeled as an asymptotically increasing function of time, and then approximating the function using buckets. For instance, ranking module 220 can be configured with set maximums at which the usage rank accumulation per hour, per day, per week, per month (and/or any other time period) can increase. The buckets (i.e., hour bucket, day bucket, week bucket, etc) can be aged as they get accumulated. With this approach, again the amount of additional data to be stored per address is low. In one embodiment, emotional rank as a function of usage distribution is based on understood principles or overall usage statistics of personal data. In another embodiment, emotional rank as a function of usage distribution is learnt from user data, per similar set of users using collaborative filtering or per user. This again is a ranking signal. Thus, over time the emotional value designated by some metadata (e.g., this is a "from address" or a "home" label) though initially estimated can be learnt for the overall target population using statistical analysis of the data. In one such embodiment, historical user profile information learnt over time per a given group or population (e.g., per country, per language, per geography, or per other cluster of similar users) can be used to develop profiles for new users that have expressed or otherwise indicated interest in that group/population.

The ranking module 220 can also (or alternatively) be configured to calculate a query independent rank for each address in the user's address book. In one such embodiment, a query independent rank (QIR) is formulated using QIR (Address)=f(usage rank signals, emotional rank signals, temporal rank signals). Usage rank signals are indicators of address usage, while emotional rank signals are indicators of more personal meaning to the user (such as home addresses or work address typically have a higher emotional value to users than do, for example, a restaurant address).

The ranking module 220 can also (or alternatively) be configured to calculate use specific ranking, where the addresses are ranked based on the user's recent searches and activity. For example, if an address used by the user is close to the locale of the user (e.g., as determined by module 210), then the ranking module 220 can assign that address a relatively higher rank (e.g., boost above average use rank) for use in the "start address" field when the user's location is estimated to be nearby. Conversely, the ranking module 220 can assign that address a relatively lower rank (e.g., deboost below average use rank, or no boost) for use in the "end address" field when the user's location is estimated to be nearby.

Also, if an address was recently used for the first time, the ranking module 220 can assign a relatively higher rank (e.g., boost above average use rank) for current use. Likewise, the ranking module 220 can be configured to boost use rank of an address by seasonality, as previously described (e.g., time of day, week, and/or year that the address is being used determines it use rank). Likewise, the ranking module 220 can be configured to boost use rank of an address by use history. For example, the ranking module 220 can compute a use rank by dividing the average weekly count of recent+future weeks use of an address by the average use over all weeks since the address's first use (e.g., address use during future weeks can be estimated, for example based on the use during those weeks in previous years).

The ranking module 220 can be configured to assign an overall boost to addresses within a drivable distance (e.g., within ~2 hours) to the current view port and/or regions the user has recently searched in, using the IP locale as estimated by the module 210 (or by other means, such as by online services used, or telephone numbers called). Conversely, the ranking module 220 can be configured to assign a lower use rank (e.g., deboost below average use rank) for addresses further away (e.g., using a gentle sigmoid).

Also, note the that ranking module 220 can be configured to implement multiple ranking orders of the same address book for different uses at the same time (e.g., as previously indicated, a "to address" can be associated with one rank, while a "from address" can be associated with another rank; such different usage ranks can be simultaneously generated). Further, note that the ranking module 220 can be configured to implement multiple ranking orders of the same address book for different users (e.g., based on user IDs).

Client-Side Personal Data Generation

Figure 3A:
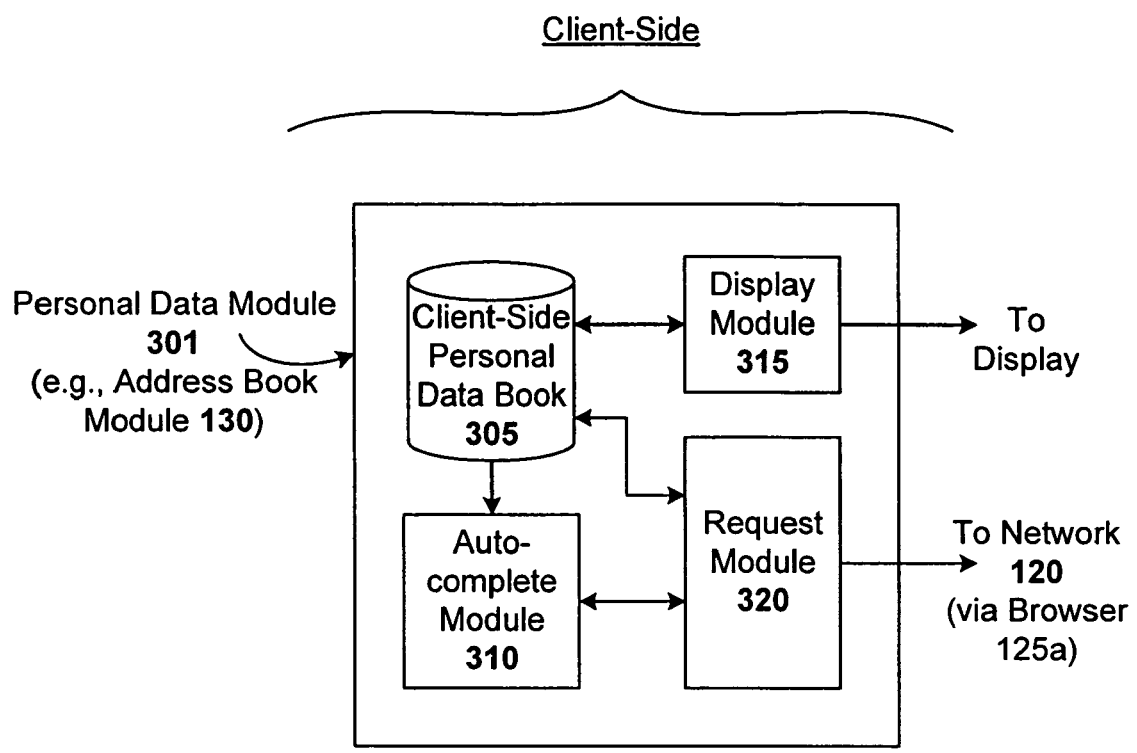
FIG. 3a is a block diagram of a client-side personal data module, such as the client-side address book module shown in FIG. 1, configured in accordance with one embodiment of the present invention.
Figure 3B:
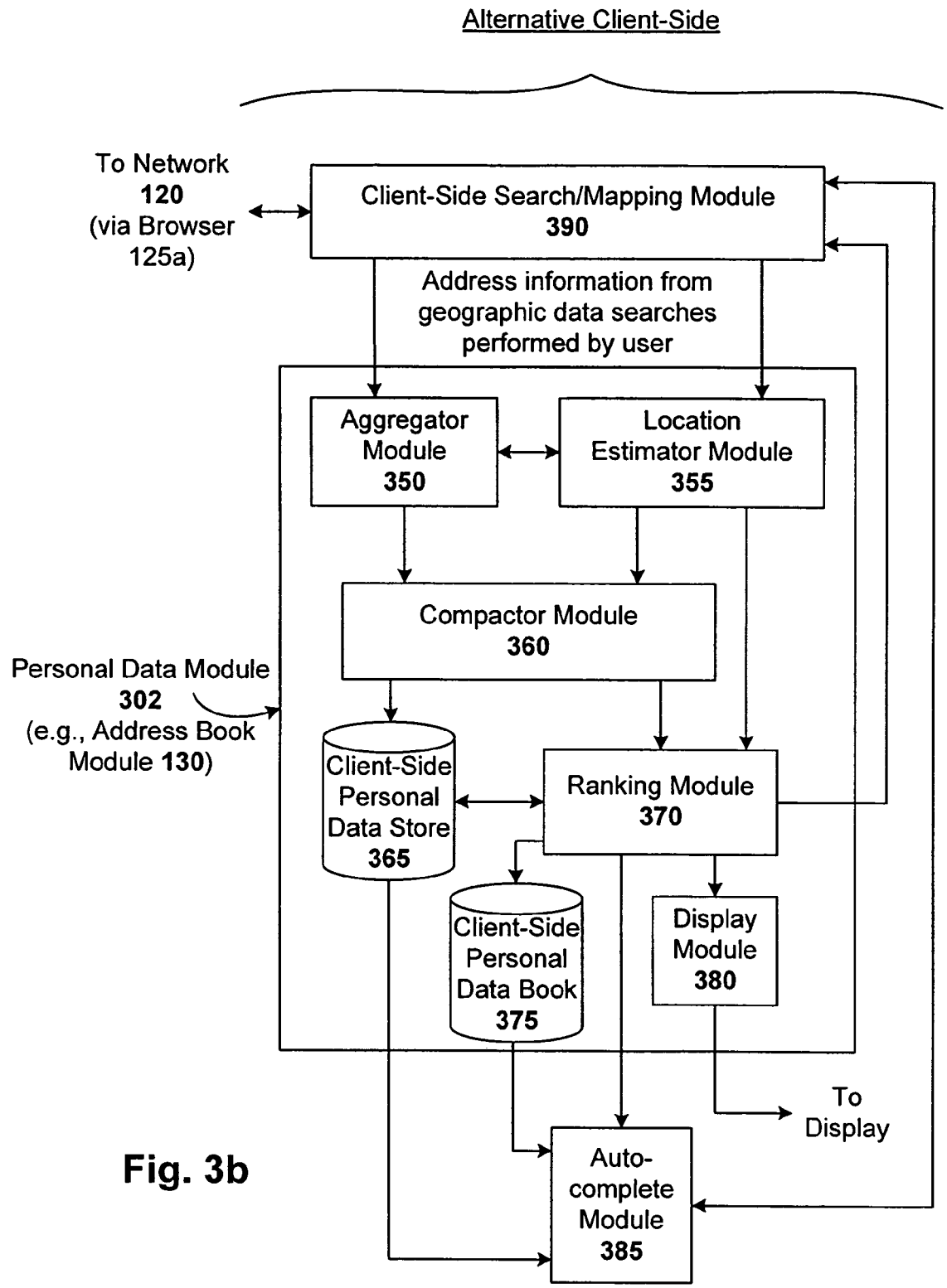
FIG. 3b is a block diagram of a client-side personal data module configured in accordance with another embodiment of the present invention.

FIG. 3a is a block diagram of a client-side personal data module 301, such as the client-side address book module 130 shown in FIG. 1, configured in accordance with one embodiment of the present invention. As can be seen, the module 130 includes a client-side personal data book 305, an autocomplete module 310, a display module 315, and a request module 320. This module 130 can be implemented for use with the server-side system shown in FIG. 2, although numerous overall system configurations will be apparent in light of this disclosure.

Each of the client-side modules can be implemented, for example, in software (e.g., C, C++, Java, JavaScript, or other suitable programming language), hardware (e.g., gate level logic or ASIC), firmware (e.g., microcontroller configured with I/O capability for receiving data from browser 125a and a number of routines for carrying out storing/accessing, autocompleting, displaying, requesting, merging, and other functions as described herein), or some combination thereof. In addition, note that the modules are shown as separate for purposes of illustration, and that other embodiments may have the various functionalities or sub-sets thereof integrated into a single module or parallel processing and/or pipelined architecture.

As previously explained, the module 130 executes within the host system's browser, in one particular embodiment. Alternatively, any executable module or agent can be implemented on the client-side, such as an application that launches at computer start-up. Recall that in one particular embodiment, the address book module 130 (or other personal data module 301) executing on the client-side of the system is programmed or otherwise configured to detect when the user has accessed online forms, and to interrogate each form to determine what information is being requested. The address book module 130 executing on the client can then access the user's personal data vault, as previously described. The monitoring/detection functionality described here can be implemented, for example, in the autocomplete module 310 and/or the request module 320. Alternatively, a distinct monitor/detection module can be programmed to monitor the user's computer use, and to detect when personal data vault access is necessary. This distinct monitor/detection module can then engage the request module 320 to retrieve the data, and feed that data to the autocomplete module 310. In one particular embodiment, the monitor/detection module is integrated into the autocomplete module 310 and configured to read tags (e.g., HTML tags/content or other indicators of data being requested) to determine when and what data is being requested. Alternatively, or in addition to, the monitor/detection module can be configured with form-based optical character recognition (OCR) capability, thereby allowing the module to determine when and what data is being requested by a particular form the user has accessed with her computer. Other configurations will be appreciated in light of this disclosure. The personal data vault can be stored on the server-side (e.g., in module 203 or other location, where personal data is served to the user on an as needed basis in real-time) or on the client-side (e.g., in module 305 or other location, where personal data is cached locally on the user's computer system), or on both sides (e.g., where all available personal data is stored on the server-side in module 203, and a sub-set of that data is cached on the client-side in module 305). In a client-side cache configuration, the cached sub-set can be selected for caching based on data rank, as described herein (e.g., based on one or more emotional value, time decay, recent/historical usage, and seasonality signals). In such a case, the local cache is queried first for requested data. If the requested data is not cached, then the remote personal data vault can be queried. The local cache can be updated and refined as ranking signals are interpreted, and as rankings shift.

As previously explained, the client-side personal data book 305 can be populated incrementally (e.g., in real-time as each address book entry is updated) or in batch (e.g., subset of address book entries or all address book entries) by the server-side system, using Ajax and JavaScript (or other suitable data transfer mechanisms). Alternatively, the client-side personal data book 305 can be downloaded, for example, in its entirety on a periodic basis or at the request of the user. Note that the client-side personal data book 305 can also be stored locally on the user's machine (e.g., on local hard drive or other suitable storage facility). The client can also incrementally or batch send addresses/usage history to the server, if so desired (e.g., for cell phone or other client applications where there is substantial client-side processing (e.g., Google Earth or other such client heavy services).

The autocomplete module 310 is configured to provide the browser with the module's 130 best guesses as to what personal data the user is likely to want. Such UI functionality further improves or eases the user's experience. In one particular embodiment, the autocomplete module 310 shows a ranked set of addresses, even if the user enters nothing or enters space in the search fields of the page provided by the server system (e.g., via the user's browser), since the ranking module 220 allows the address book service to infer or otherwise guess the addresses the user is likely to use, based on recent usage and other hints based on metadata and user activity (e.g., the "from" IP address indicates user locality, frequency of use indicates high emotional and use ranks, context of use), as previously described. Also, addresses provided by the autocomplete module 310 can be programmed or otherwise configured to presort by rank, so as to allow users to access the most important addresses matching the string they entered, or to browse (e.g., hit space) and autocomplete an address without ever entering any part of the address. In any such cases, dynamic autocomplete is enabled. For instance, the list of addresses provided by autocomplete module 310 changes based on whether the user is using her home computer, or her work computer. Likewise, the list of addresses (and/or their rank) provided by autocomplete module 310 changes based on whether the user is using her computer at night (e.g., where the top ranked social addresses are provided by the autocomplete module 310), or in the daytime (e.g., where the top ranked work-related addresses are provided by the autocomplete module 310), or the context of the user's application for which the addresses are being accessed. In one particular embodiment, the autocomplete module 310 is implemented as described in U.S. application Ser. No. 10/425,295, filed Apr. 29, 2003, and titled "Methods and Apparatus for Assisting in Completion of a Form." This application is herein incorporated in its entirety by reference. Numerous autocomplete functions will be apparent in light of this disclosure, whether dynamic or static in nature.

The autocomplete module 310 may also be configured to filter out "garbage" based on if the user entered address is useful. For example, if the user accidentally enters an incorrect address (e.g., typo), without a filtering function, that incorrect address shows up in the autocomplete list, thereby making the autocomplete function less useful (not to mention the user may accidentally send mail to an incorrect email address, or get directions to the wrong street address). Thus, in one embodiment, autocomplete module 310 is further configured for managing autocomplete entries, where entries that are determined to be incorrect are discarded (or ranked low) so that they are not displayed to the user. Erroneous or mistaken entries (or spam) can be detected based both on statistics, invalid responses and/or any signals that indicate a bad piece of data. For instance, if an email bounces, or a street address does not geocode, or stock ticker does not return a result, are all signals indicating erroneous data. Likewise, the autocomplete module 310 can be configured to proactively analyze user data to ensure it is correct prior to user. For instance, email addresses can be analyzed for proper conformation (e.g., look for "1" and ".com" or ".net" or ".edu" etc).

The autocomplete module 310 can generate the best guess list of personal data (whether addresses, email addresses, stocks, etc) by accessing the personal data book 305, and can also access the remote personal data store 203 of the server-side system, by operation of the request module 320. The request module 320 is programmed or otherwise configured to allow the module 301 to communicate over the network 120 via the user's browser to the server-side system, as needed.

Other UI functionality can be implemented by the system to further improve or ease the user's experience. For instance, when the user accesses the server system 105 (e.g., via URL or other request) to conduct a search, a default address (e.g., home address or work address) can be automatically filled in the "start address" field of the page that is served to the user, based on the user's recent activity or metadata from which inferences can be drawn about which address to provide as default. This default address can be dynamically adjusted (rather than a static address based on recent use based ranking). As previously explained, for instance, the default data pre-filled in the served page can be set based on the time and/or the locality from which the request was sent (e.g., work default data is very different from home default data).

The display module 315 is programmed or otherwise configured to display a small number of addresses (e.g., 0 to 5 addresses), where the order of addresses is determined by factors such as the overall rank of each address with a higher bias towards addresses that are recently important (e.g., recently created or recently used are promoted in rank, but addresses one always uses, like home/work addresses, are demoted). In one particular embodiment, the display module 315 uses the residual of the maximum rank accumulation and applies a high pass filter to bias towards the higher frequency signal part of the rank vs. time signal. The display module 315 can then display each of these addresses in a compact form (e.g., compact address followed by an optional short snippet about that address, and how the user has previously used it). Depending on the search after which this was displayed, the display module 315 can then dynamically switch the display mode and the ranking algorithm driven by metrics of which addresses are most useful given the type of search. For example, in the maps/local home page served to the user, the display module 315 shows addresses with a high bias towards recently used addresses. Also, after an address search, the display module 315 shows the addresses the user most often gets directions from/to and modify the display ease getting those directions (e.g., such as a one-click get address UI control). Also, after a local search (e.g., pizza near/in San Francisco), the display module 315 shows addresses with a bias towards addresses the user often (e.g., 3 times or more) searches near, and provide links to repeat search using one of those addresses as the "near" address. After a from/to directions search, the display module 315 shows addresses with a bias towards recent addresses, and allows user to route from/to/via one of the recent addresses. Next to each displayed address, the display module 315 can be configured to provide one or more links to, for example, delete/edit/label the address, so that managing the address book (or other personal data) becomes an incremental task, not a chore where the user has to go out of the way.

FIG. 3b is a block diagram of a client-side personal data module 302 configured in accordance with another embodiment of the present invention.

As can be seen, this alternative client-side architecture includes a client-side search/mapping module 390 which is in communication with the personal data module 302 (e.g., client-side address book module 130 shown in FIG. 1 for purposes of discussion). By implementing local search engine functionality with client-side search/mapping module 390, less requests (or none) to the server-side are required. The previous discussion with reference to server system 105 equally applies to the client-side search/mapping module 390. Further, note that this alternative client-side architecture can still access and use the server-side system shown in FIG. 2 (including server system 105) to supplement the client-side search functionality (an other functionality), if so desired and/or as necessary.

In addition to this local search engine functionality, the client-side address book module 130 (or other personal data module 302) functionality previous discussed with reference to the server-side personal generator module 201. In particular, the module 130 include an aggregator module 350, a location estimator module 355, a compactor module 360, an address ranking module 370, and a client-side personal data store. Each of these modules corresponds to a similarly named module discussed with reference to FIG. 2 (i.e., aggregator module 205, location estimator module 210, compactor module 215, address ranking module 220, and personal data store 203, respectively). The previous discussion with reference to these modules of FIG. 2 equally applies to the similarly named modules of FIG. 3b.

The address book module 130 also includes a client-side personal data book 375 and a display module 380, each of which corresponds to a similarly named module discussed with reference to FIG. 3a (i.e., client-side personal data book 305 and display module 315, respectively). The previous discussion with reference to these modules of FIG. 3a equally applies to the similarly named modules of FIG. 3b. Further, the alternative architecture of FIG. 3b includes an autocomplete module 385. The previous discussion with reference to the autocomplete module 310 of FIG. 3a equally applies to the module 385 of FIG. 3b.

Recall that in the embodiment discussed with reference to FIG. 3a, the autocomplete module 310 was integrated into the module 130. In the embodiment shown in FIG. 3b, the autocomplete module 385 is implemented separately from the module 130. Thus, one embodiment of the invention can be a dynamic autocomplete function as described herein. Such a function can be used in many applications, such as in an email application, where the user's "to" box of the email interface is dynamically autocompleted for the user based on the user's location and/or computer (e.g., night time on home computer, then autocomplete favors social contacts; day time on work computer, then autocomplete favors professional contacts). Likewise, in a search application such as for general searches, discussion group searches, blog searches, etc, where the user's "text search" box of the search interface is dynamically autocompleted for the user based on the time of day and user's previous use patterns (e.g., historically, the user accesses blogs on marketing trends and industry-centric discussion groups during the day, but at night accesses blogs on fly-fishing and dream vacation discussion groups). Likewise, in a financial application, where the user's "financial entity search" box of the financial service interface is dynamically autocompleted for the user based on the time of day, month, or year (e.g., favor user mutual funds in morning, and user stocks in afternoon; favor company names of user held stocks associated with recently issued quarterly reports or other significant company news). In this sense, the dynamic autocomplete function essentially suggests to user what to search for. Numerous variations and applications for a dynamic autocomplete function will be apparent in light of this disclosure, and the present invention is not intended to be limited to any one particular configuration.

Another difference between the embodiments of FIGS. 3a and 3b is that, in the embodiment of FIG. 3b, the ranking module 370 can communicate directly with the client-side personal data book 375, the autocomplete module 385, and the display module 380. In the embodiment of FIG. 3a, communication between these modules was achieved via the server system 105, network 120, and request module 320. In addition, the autocomplete module 385 can communicate directly with client-side personal data store 365, and provide autocomplete data directly to the client-side search/mapping module 390. Further, the functionality of the request module 320 (of the FIG. 3a embodiment) is effectively integrated into the module 390 (of the FIG. 3b embodiment). In any such cases, conventional and/or custom client-server, inter-process communication, and intra-process communication techniques can be employed to implement the various functionalities and interactions described herein. Various trade-offs and efficiencies that can be implemented will depend on the particular application, and use of client-side functions such as caching, search capability, and ranking can be implemented as desired.

Methodologies

Figure 4:
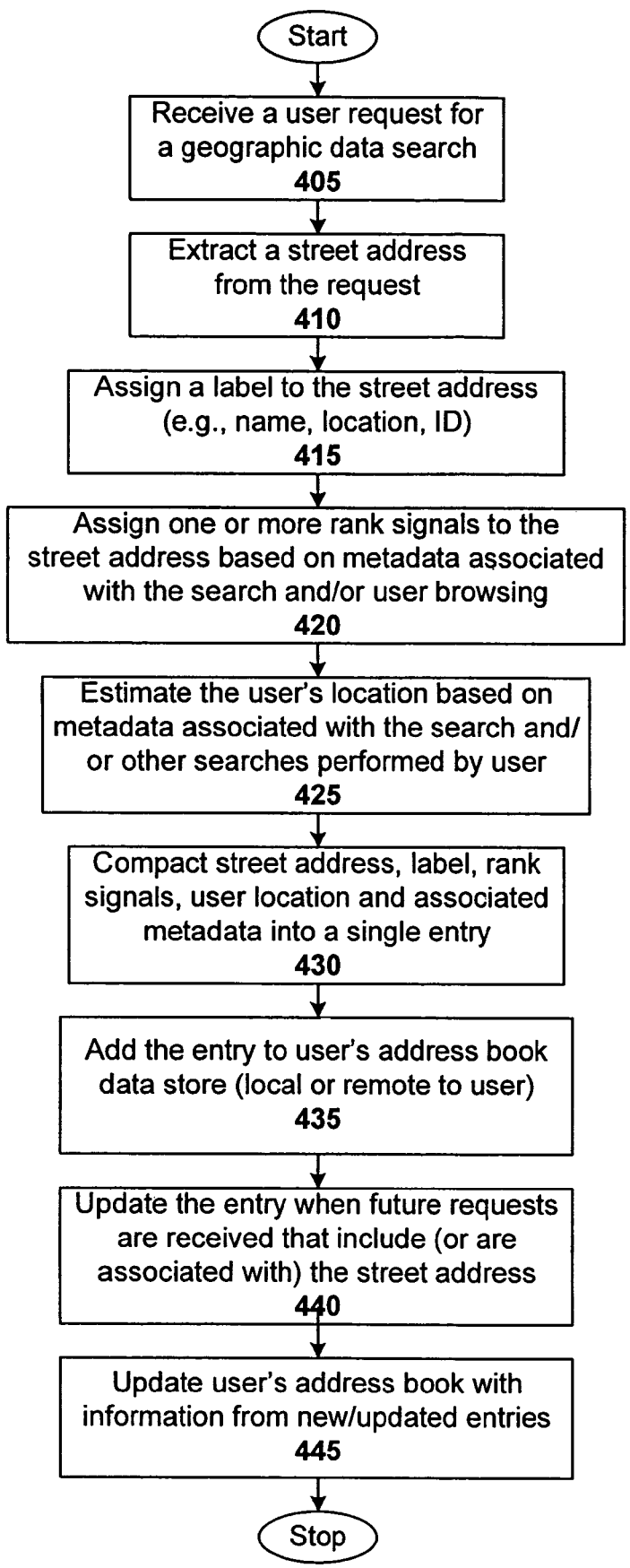
FIG. 4 illustrates a method for automatically generating a user's address book in accordance with an embodiment of the present invention.

FIG. 4 illustrates a method for automatically generating a user's address book in accordance with an embodiment of the present invention. This method can be implemented, for example, in software as discussed with reference to the systems depicted in FIGS. 1, 2, 3a, and 3b, and can be carried out on the server-side, the client-side, or a combination thereof. Numerous implementations will be apparent in light of this disclosure.

The method includes receiving 405 a user request for a geographic data search (e.g., such as a request for map data or driving directions), and extracting 410 a street address from the request. The method continues with assigning 415 a label to the street address, such as a person's name or business name that corresponds to the street address, and/or location where that address is used (e.g., home or work), and/or an ID. Recall that this step may further include accessing an online directory of residential and/or commercial address listing, and matching the extracted address to one of the listing to identify the correct label.

The method continues with assigning 420 one or more ranking signals to the street address based on metadata associated with the search and/or user browsing activity (e.g., as previously explained, where addresses are ranked using ranking signals such as those that indicate emotional value, time decay, and/or seasonality). The method continues with estimating 425 the user's location based on metadata associated with the search, and/or previous searches performed by the user. For instance, the IP address associated with the user's location can be used to guess the user's location. Likewise, the user's frequent and/or historical use of the same address in the "start address" box of the mapping system interface tends to indicate the user is at that address, when that address is subsequently used as the "start address."

The method continues with compacting 430 the street address, label, one or more ranking signals, user location, associated metadata, and other related or relevant data into a single entry associated with that street address. The method continues with adding 435 the entry to user's address book data store, which can be local to the user (e.g., as in FIG. 3b) or remote to user (e.g., as in FIG. 3a). The method continues with updating 440 the entry when future requests are received that include the street address. Such updates may include, for example, updating metadata statistics and/or ranking signals. Likewise, the updating may include changing the localities associated with the use of the address, or simply adding data to the entry that was previously unavailable. The method continues with updating 445 the user's address book with information from new/updated entries (e.g., using Ajax and JavaScript or other suitable mechanism).

Figure 5:
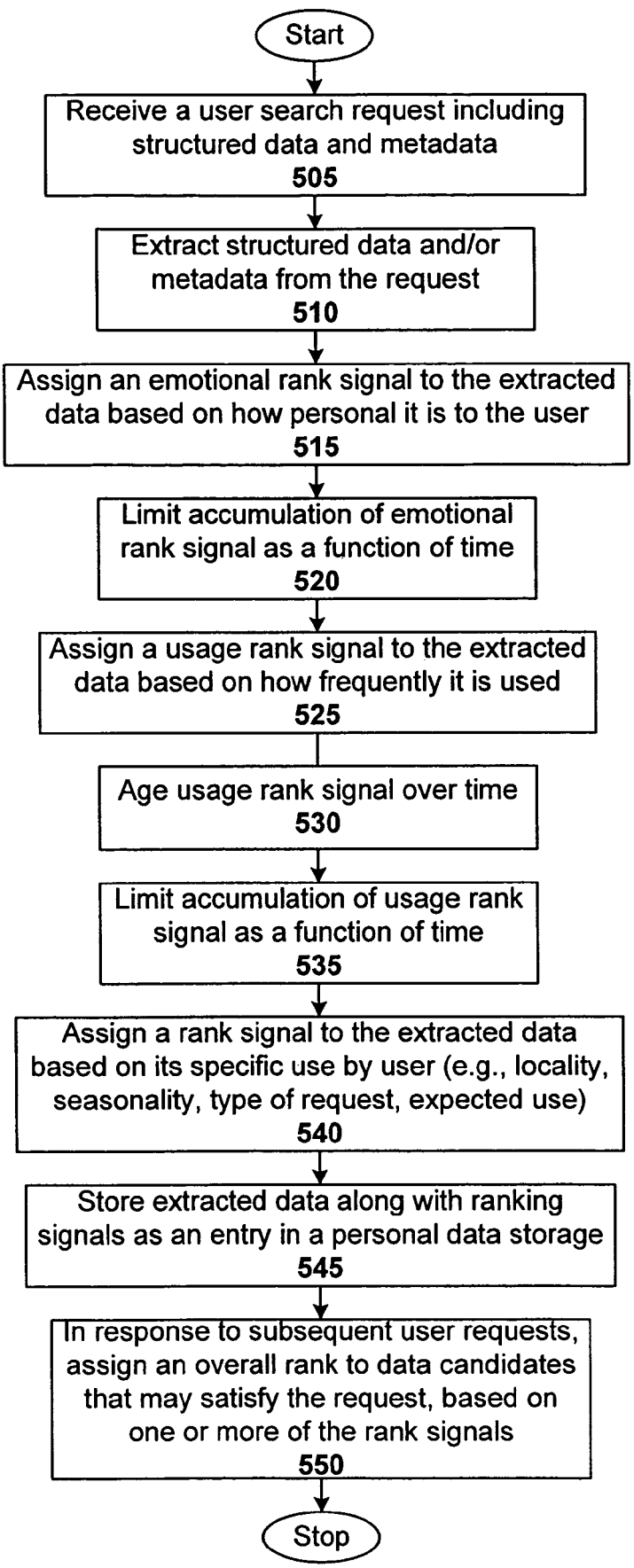
FIG. 5 illustrates a method for dynamically ranking entries in a user's personal data book in accordance with an embodiment of the present invention.

FIG. 5 illustrates a method for dynamically ranking entries in a user's personal data book in accordance with an embodiment of the present invention. This method can be implemented, for example, in software as discussed with reference to the systems depicted in FIGS. 1, 2, 3a, and 3b, and can be carried out on the server-side, the client-side, or a combination thereof. Numerous implementations will be apparent in light of this disclosure.

The method includes receiving 505 a user search request including structured data and metadata (e.g., such as a request for map data or driving directions), and extracting 510 structured data and/or metadata from the request (e.g., a street address and associated metadata such as time, locality of user, and context of use). The method continues with assigning 515 an emotional rank signal to the extracted data based on how personal it is to the user. For instance, addresses that are frequently used as the "start address" or "near address" in mapping system applications can be inferred to be home/work addresses of the user, or addresses of people important to the user. Such addresses therefore have an emotional value to the user, and are assigned an emotional ranking signal (or boost in rank) to distinguish them from addresses of lesser emotional value. The method may also include limiting 520 accumulation of emotional rank signal as a function of time, as previously described with reference to modules 220 and 370.

The method may also include assigning 525 a usage-based rank signal to the extracted data (e.g., based on how frequently it is used), and aging 530 that usage rank signal over time, as previously described with reference to modules 220 and 370. The method may include limiting 535 accumulation of usage rank signal as a function of time, similar to 520. The method may include assigning 540 a rank signal to the extracted data based on its specific use by user (e.g., locality, seasonality, and context such as type of request and/or expected use; note that there can be a rank signal for each of these), as previously described with reference to modules 220 and 370. The method includes storing 545 the extracted data along with it corresponding ranking signals as an entry in a personal data storage, as previously described herein (note that other data, such as labels, and metadata, may also be stored in the corresponding entry.

In response to a subsequent user request or need for data from the personal data book, the method continues with assigning 550 an overall rank to data candidates (from the user's personal data storage) that may satisfy that request/need, based on one or more rank signals associated with each of those candidates. For instance, in an address book application, address ranking favors work related addresses if at a work locality, and favors home related addresses if at a home locality. In a similar fashion, the time of day (or season, etc) at which a user is accessing the address book (or other personal data) can be used to effect an overall ranking. For instance, if daytime during the work week, then address ranking can favor work related addresses. Likewise, if nighttime or a weekend, then address ranking can favor home related addresses.

Figure 6:
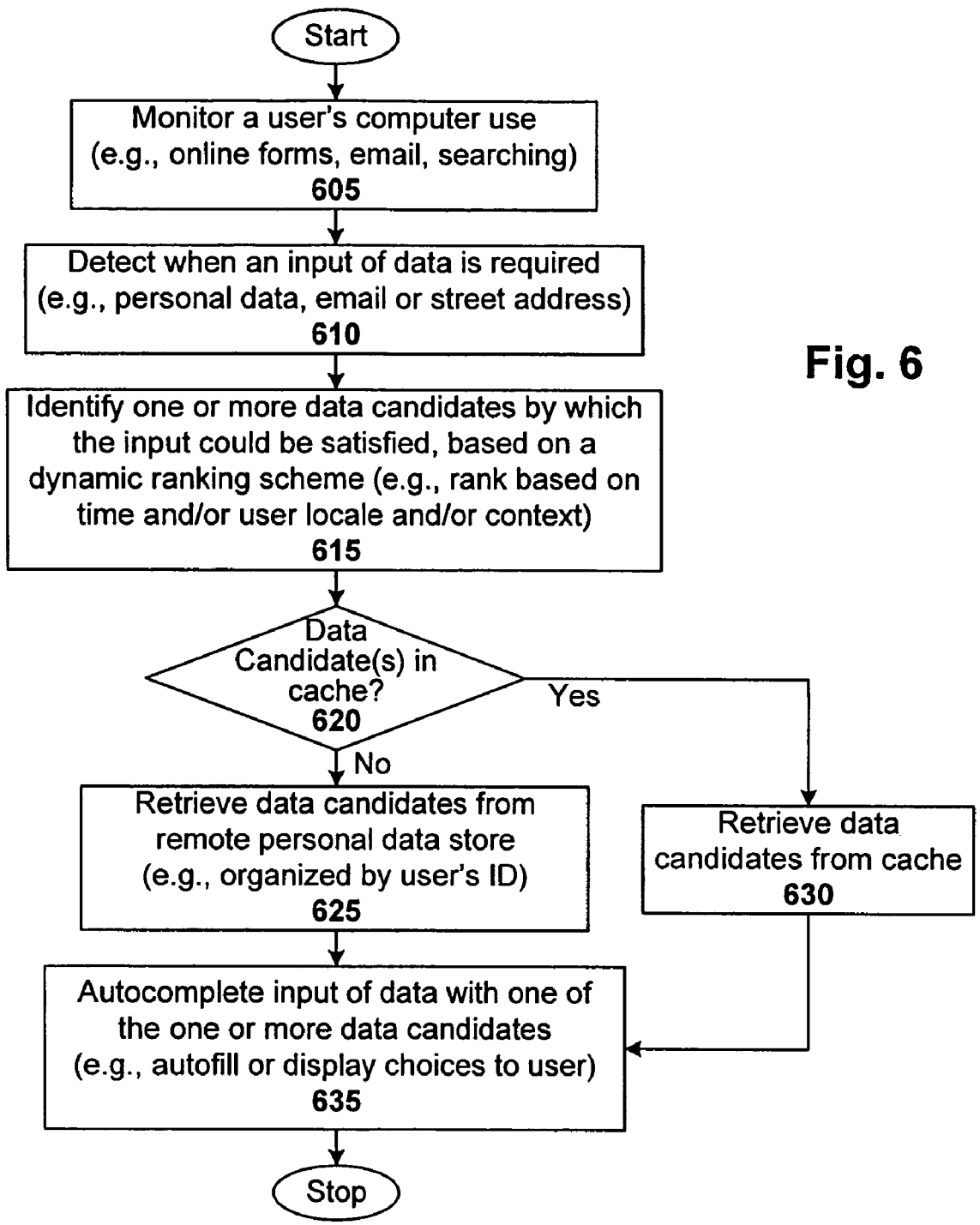
FIG. 6 illustrates a method for dynamically autocompleting a personal data entry for a user in a computer-based application, in accordance with an embodiment of the present invention.

FIG. 6 illustrates a method for dynamically autocompleting a personal data entry for a user in a computer-based application, in accordance with an embodiment of the present invention. This method can be implemented, for example, in software as discussed with reference to the systems depicted in FIGS. 1, 2, 3a, and 3b, and can be carried out on the server-side, the client-side, or a combination thereof. The computer-based application can be, for instance, an email application and the input of data is an email address. Alternatively, the computer-based application can be a browser application operatively coupled to a search engine, and the input of data is one or more search terms (e.g., general search, financial search, geographic information search, blog search, news search, etc). Numerous implementations will be apparent in light of this disclosure.

The method includes monitoring 605 a user's computer use, and detecting 610 when an input of data is required by the computer-based application (e.g., such as using a computer to access and complete online forms with personal data, or to send an email to one or more email addresses, or to conduct an online search for information on a particular stock or driving directions from the user's home to another location). In one such embodiment, steps 605 and 610 are carried out using a monitor/detection module as discussed with reference to the autocomplete modules 310 and 385.

The method continues with identifying 615 one or more data candidates by which the input could be satisfied, based on a dynamic ranking scheme associated with the user (e.g., rank based on time and/or user locale and/or context and/or user browsing activity, as previously discussed with reference to FIG. 5). Note that one data candidates can also be identified and/or otherwise refined based on partial user input, as discussed as discussed in the previously incorporated U.S. patent Ser. No. 10/425,295. The method further includes determining 620 if the one or more data candidates are in cache (or otherwise locally available). If so, then the method continues with retrieving 630 the one or more data candidates from the cache. Otherwise, the method continues with retrieving 625 the one or more data candidates from a remote personal data store, as previously described with reference to FIG. 2. In one particular embodiment, the personal data store is organized by the user's ID and/or user name (or other suitable storage/indexing scheme), so that the one or more data candidates can be readily accessed and provided back to the user.

The method continues with autocompleting 635 the input of data with one of the one or more data candidates. In one such case, this autocompleting includes displaying the one or more data candidates to the user, so that the user can select one of the one or more data candidates (e.g., using a pull-down menu or other suitable user interface provided proximate the data entry box as discussed in the previously incorporated U.S. patent Ser. No. 10/425,295), and then autofilling the selected data candidate into the input for the user. Recall that displaying the one or more data candidates can be in response to partial data manually entered by the user. Alternatively, displaying the one or more data candidates can be carried out prior to manual data entry into the input by the user (e.g., based on the dynamic ranking scheme). Alternatively, the autocompleting may include autofilling a single best guess (e.g., based on best rank), and then allow the user to refine that guess, if necessary.

Figure 7:
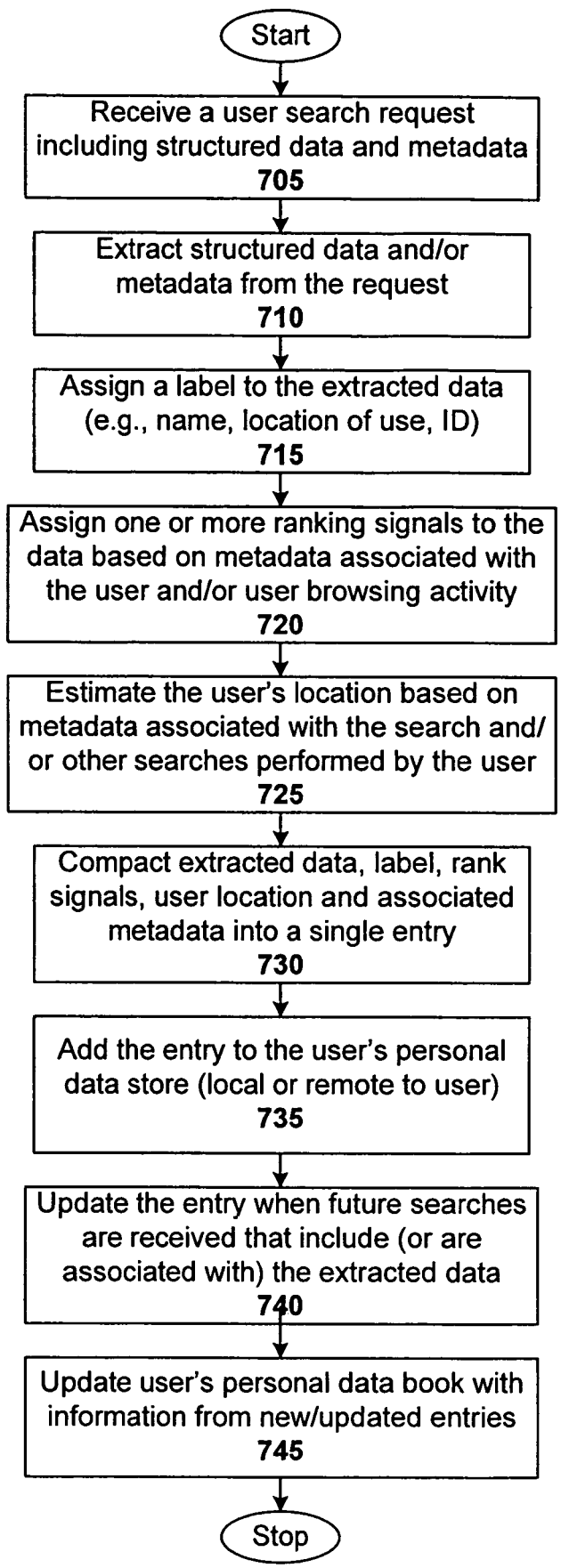
FIG. 7 illustrates a method for automatically generating a personal data book for a user, in accordance with an embodiment of the present invention.

FIG. 7 illustrates a method for automatically generating a personal data book for a user, in accordance with an embodiment of the present invention. This method can be implemented, for example, in software as discussed with reference to the systems depicted in FIGS. 1, 2, 3*a*, and 3*b*, and can be carried out on the server-side, the client-side, or a combination thereof. Numerous implementations will be apparent in light of this disclosure.

The method includes receiving 705 a user search request including structured data and metadata. The search request could be, for example, for financial data service. Alternatively, the search request could be for a social or discussion group service, or a blog service, or for a general search service. Any type of search request including structured data can be received. The method continues with extracting 710 structured data and/or metadata from the request, and assigning 715 a label to the extracted data, such as user name and/or location of use, and/or user ID.

The method continues with assigning 720 one or more ranking signals to the data, based on metadata associated with the user and/or user browsing activity, as previously discussed for example with reference to FIGS. 2 and 3*b* and modules 220 and 370. Note that these one or more ranking signals can be maintained incrementally, as new data becomes available). The method continues with estimating 725 the user's location based on metadata associated with the search, and/or previous searches performed by the user (e.g., as discussed with reference to modules 210 and 355), and compacting 730 the extracted data, label, ranking signals, user location, associated metadata and other relevant data into a single entry (e.g., as discussed with reference to modules 215 and 360).

The method continues with adding 735 the entry to the user's personal data store (which can be local or remote to the user), and updating 740 the entry when future searches are received that include the extracted data (or are otherwise associated with the extracted data). Each entry of the user's personal data store can include any type of personal data, such as street addresses or any structured (or domain specific) entities for which a user can search. The method continues with updating 745 the user's personal data book with information from new/updated entries. The user's personal data book can be, for example, an address book, a book of financial entities (e.g., stocks, companies, mutual funds), a book of favorite blogs, a book of favorite discussion groups, a book of email addresses.

In any case, more or more candidates of the personal data can be ranked (based on ranking signals) and provided to an autocompleter function to ease the user's data entry and recall burden. Numerous applications can be implemented, and the present invention is not intended to be limited to any one in particular.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. In a computer system including an address book application and a plurality of computer applications that are independent from the address book application, a computer-implemented method for dynamically autocompleting a data entry field for a user into any of the plurality of independent computer applications, the method comprising:
   monitoring usage data of the user as the usage data is directed to any of the plurality of independent computer applications;
   extracting contact information from the usage data;
   storing the contact information as contact entries to create an address book for the user, wherein the address book is configured to allow the user to access and edit the contact entries in the address book;
   determining that an input of data is required in the data entry field of one of the plurality of independent computer applications;
   determining a valid type of contact entry that is acceptable by the independent computer application requiring the input of data;
   ranking the contact entries in the address book based at least on current locality information of the user and the valid type of contact entry to determine one or more data candidates from the address book for the input of data in the data entry field; and
   autocompleting the input of data into the data entry field of the independent computer application with at least one of the data candidates from the address book.

2. In a computer system including a personal data book application and a plurality of computer applications that are independent from the personal data book application, a computer-implemented method for dynamically autocompleting a data entry field for a user into the plurality of independent computer applications, the method comprising:

monitoring usage data of the user as the usage data is directed to the plurality of independent computer applications, wherein the plurality of independent computer applications include an address book application, a mapping application and an email application;

extracting contact information from the usage data responsive to the usage data being directed to the address book application or the email application;

extracting address information from the usage data responsive to the usage data being directed to the mapping application;

storing the contact information or address information as entries to create a personal data book for the user, wherein the personal data book is configured to allow the user to access and edit the entries in the personal data book;

determining that an input of data is required in the data entry field of one of the plurality of independent computer applications;

determining a valid type of entry that is acceptable by the independent computer application requiring the input of data;

ranking the entries in the personal data book based at least on current locality information of the user and the valid type of entry to determine one or more data candidates from the personal data book for the input of data in the data entry field; and autocompleting the input of data into the data entry field of the independent computer application with at least one of the data candidates from the personal data book.

3. The method of claim 1 or 2, wherein autocompleting the input of data comprises:

displaying the one or more data candidates to the user;

receiving a selection of at least one of the one or more data candidates; and autofilling the selected data candidate into a user interface associated with the independent computer application.

4. The method of claim 3, wherein displaying the one or more data candidates is responsive to receiving from the user a partial data entry into the data entry field.

5. The method of claim 3, wherein autofilling the input of data is responsive to receiving from the user a partial data entry into the data entry field.

6. The method of claim 1 or 2, wherein a rank assigned to each of the one or more data candidates is based on a geographic location of the user.

7. The method of claim 1 or 2, wherein a rank assigned to each of the one or more data candidates is based on a time of use associated with each of the one or more data candidates.

8. The method of claim 1 or 2, wherein a rank assigned to each of the one or more data candidates is based on user browsing activity.

9. The method of claim 1 or 2, wherein a rank assigned to each of the one or more data candidates is based on usage context of the one or more data candidates.

10. The method of claim 1 or 2, further comprising:

determining if the one or more data candidates is locally available;

responsive to the one or more data candidates being locally available, accessing the one or more data candidates locally; and responsive to the one or more data candidates not being locally available, accessing the one or more data candidates from a remote storage via a communications network.

11. The method of claim 1 or 2, further comprising:

estimating the user's geographic location based on metadata associated with at least one of the independent computer applications and previous searches performed by the user.

12. The method of claim 11, wherein estimating the user's geographic location is based on an IP address associated with at least one of the independent computer applications.

13. The method of claim 1 or 2, wherein the valid type of entry is a street address.

14. The method of claim 2, wherein the valid type of entry is an email address.

15. The method of claim 1 or 2, wherein one of the plurality of independent computer applications is a browser application operatively coupled to a search engine and the input of data is one or more search terms.

16. A computer program product having a computer-readable storage medium storing computer-executable instructions for dynamically autocompleting a data entry field for a user in a plurality of independent computer applications within a computer system, the computer system including an address book application and the plurality of independent computer applications that are independent from the address book application, the instructions when executed by a processor perform the method comprising:

monitoring usage data of the user as the usage data is directed to any of the plurality of independent computer applications;

extracting contact information from the usage data;

storing the contact information as contact entries to create an address book for the user, wherein the address book is configured to allow the user to access and edit the contact entries in the address book;

determining that an input of data is required in the data entry field of one of the plurality of independent computer applications;

determining a valid type of contact entry that is acceptable by the independent computer application requiring the input of data;

ranking the contact entries in the address book based at least on current locality information of the user and the valid type of contact entry to determine one or more data candidates from the address book for the input of data in the data entry field; and autocompleting the input of data into the data entry field of the independent computer application with at least one of the data candidates from the address book.

17. A computer program product having a computer-readable storage medium storing computer-executable instructions for dynamically autocompleting a data entry field for a user in a plurality of independent computer applications within a computer system, the computer system including a personal data book application and the plurality of independent computer applications that are independent from the personal data book application, the instructions when executed by a processor perform the method comprising:

monitoring usage data of the user as the usage data is directed to the plurality of independent computer applications, wherein the plurality of independent computer applications include an address book application, a mapping application and an email application;

extracting contact information from the usage data responsive to the usage data being directed to the address book application or the email application;

extracting address information from the usage data responsive to the usage data being directed to the mapping application;

storing the contact information or address information as entries to create a personal data book for the user, wherein the personal data book is configured to allow the user to access and edit the entries in the personal data book;

determining that an input of data is required in the data entry field of one of the plurality of independent computer applications;

determining a valid type of entry that is acceptable by the independent computer application requiring the input of data;

ranking the entries in the personal data book based at least on current locality information of the user and the valid type of entry to determine one or more data candidates from the personal data book for the input of data in the data entry field; and autocompleting the input of data into the data entry field of the independent computer application with at least one of the data candidates from the personal data book.

18. A computer-implemented system for dynamically autocompleting a data entry field for a user, the system comprising:

an address book application;

a plurality of independent computer applications that are independent from the address book application, a computer processor; and a computer-readable storage medium storing instructions when executed by the processor perform a method, the method comprising:

monitoring usage data of the user as the usage data is directed to any of the plurality of independent computer applications;

extracting contact information from the usage data;

storing the contact information as contact entries to create an address book for the user, wherein the address book is configured to allow the user to access and edit the contact entries in the address book;

determining that an input of data is required in the data entry field of one of the plurality of independent computer applications;

determining a valid type of contact entry that is acceptable by the independent computer application requiring the input of data;

ranking the contact entries in the address book based at least on current locality information of the user and the valid type of contact entry to determine one or more data candidates from the address book for the input of data in the data entry field; and autocompleting the input of data into the data entry field of the independent computer application with at least one of the data candidates from the address book.

19. A computer-implemented system for dynamically autocompleting a data entry field for a user, the system comprising:

a personal data book application;

a plurality of independent computer applications that are independent from the address book application, a computer processor; and a computer-readable storage medium storing instructions when executed by the processor perform a method, the method comprising:

monitoring usage data of the user as the usage data is directed to the plurality of independent computer applications, wherein the plurality of independent computer applications include an address book application, a mapping application and an email application;

extracting contact information from the usage data responsive to the usage data being directed to the address book application or the email application;

extracting address information from the usage data responsive to the usage data being directed to the mapping application;

storing the contact information or address information as entries to create a personal data book for the user, wherein the personal data book is configured to allow the user to access and edit the entries in the personal data book;

determining that an input of data is required in the data entry field of one of the plurality of independent computer applications;

determining a valid type of entry that is acceptable by the independent computer application requiring the input of data;

ranking the entries in the personal data book based at least on current locality information of the user and the valid type of entry to determine one or more data candidates from the personal data book for the input of data in the data entry field; and autocompleting the input of data into the data entry field of the independent computer application with at least one of the data candidates from the personal data book.

* * * * *